US012637583B2

(12) United States Patent
Bokhart et al.

(10) Patent No.: US 12,637,583 B2
(45) Date of Patent: May 26, 2026

(54) MULTILAYER COATING SYSTEMS OBTAINED FROM BLOCK COPOLYMER CONTAINING BASECOAT COMPOSITIONS

(71) Applicants: BASF Coatings GmbH, Muenster (DE); Colorado State University Research Foundation, Fort Collins, CO (US); Cypris Materials, Berkeley, CA (US)

(72) Inventors: Rosalva Castrejon Bokhart, Research Triangle Park, NC (US); Qingling Zhang, Southfield, MI (US); Donald H. Campbell, Hartland, MI (US); Daniel Patrick Ferris, Southfield, MI (US); Garret Miyake, Fort Collins, CO (US); Ryan Pearson, Berkeley, CA (US); Matthew Ryan, Berkeley, CA (US); Luke Whitson, Berkeley, CA (US); Alexander Hess, Berkeley, CA (US)

(73) Assignees: BASF COATINGS GMBH, Muenster (DE); COLORADO STATE UNIVERSITY RESEARCH FOUNDATION, Fort Collins, CO (US); CYPRIS MATERIALS, Berkeley, CA (US)

( * ) Notice: Subject to any disclaimer, the term of this patent is extended or adjusted under 35 U.S.C. 154(b) by 342 days.

(21) Appl. No.: 18/547,467

(22) PCT Filed: Mar. 18, 2022

(86) PCT No.: PCT/EP2022/057112
§ 371 (c)(1),
(2) Date: Aug. 22, 2023

(87) PCT Pub. No.: WO2022/195056
PCT Pub. Date: Sep. 22, 2022

(65) Prior Publication Data

US 2024/0150609 A1 May 9, 2024

(30) Foreign Application Priority Data

Mar. 19, 2021 (EP) .................................... 21163605

(51) Int. Cl.

| | |
|---|---|
| ***C09D 165/00*** | (2006.01) |
| ***C08G 61/08*** | (2006.01) |
| ***C08G 63/08*** | (2006.01) |
| ***C09D 5/32*** | (2006.01) |
| ***C09D 5/33*** | (2006.01) |

(52) U.S. Cl.
CPC ........... *C09D 165/00* (2013.01); *C08G 61/08* (2013.01); *C08G 63/08* (2013.01); *C09D 5/004* (2013.01); *C09D 5/32* (2013.01); *C08G 2261/135* (2013.01); *C08G 2261/3324* (2013.01); *C08G 2261/418* (2013.01); *C08G 2261/76* (2013.01)

(58) Field of Classification Search
CPC ........ C09D 165/00; C09D 5/004; C09D 5/32; C09D 5/00; C08G 61/08; C08G 63/08; C08G 2261/135; C08G 2261/3324; C08G 2261/418; C08G 2261/76; C08G 63/912; C08G 63/00; B05D 7/577; B05D 7/587; B05D 7/572; C08L 65/00; C08L 25/06; C08L 67/04
See application file for complete search history.

(56) References Cited

U.S. PATENT DOCUMENTS

| | | | | |
|---|---|---|---|---|
| 2013/0324666 | A1 | 12/2013 | Xia et al. | |
| 2014/0142249 | A1 | 5/2014 | Cho et al. | |
| 2016/0024246 | A1 | 1/2016 | Mahanthappa et al. | |
| 2016/0068669 | A1* | 3/2016 | Macfarlane .......... | C09D 153/00 524/505 |
| 2016/0289392 | A1 | 10/2016 | Grubbs et al. | |
| 2018/0094099 | A1 | 4/2018 | Johnson et al. | |
| 2018/0258230 | A1 | 9/2018 | Grubbs et al. | |
| 2019/0010353 | A1* | 1/2019 | Steinmetz ............ | C09D 171/02 |
| 2020/0181447 | A9 | 6/2020 | Steinmetz et al. | |
| 2020/0283558 | A1 | 9/2020 | Jaunky et al. | |

FOREIGN PATENT DOCUMENTS

| | | | |
|---|---|---|---|
| WO | 2018039577 | A1 | 3/2018 |
| WO | 2020/160299 | A1 | 8/2020 |
| WO | 2020180427 | A1 | 9/2020 |

OTHER PUBLICATIONS

Bolton et al., "Synthesis and Melt Self-Assembly of PS-PMMA-PLA Triblock Bottlebrush Copolymers", Macromolecules, vol. 47, pp. 2864-2874 (2014).
Boyle et al., "Impact of backbone composition on homopolymer dynamics and brush block copolymer self-assembly", Polym. Chem, vol. 11, pp. 7147-7158 (2020).

(Continued)

*Primary Examiner* — Blaine Copenheaver
(74) *Attorney, Agent, or Firm* — Armstrong Teasdale LLP

(57) ABSTRACT

Disclosed herein is a multilayer coating system present on a substrate and including at least three coating layers L1, L2 and L3 different from one another, namely a first pigmented coating layer L1 applied over at least a portion of the substrate, a second coating layer L2 applied over the first pigmented coating layer L1, and a third coating layer L3 applied over the second coating layer L2, where the second coating layer L2 is formed from a coating composition including at least one block copolymer containing a backbone and at least two blocks B1 and B2 and side chains S1 and S2 including different polymeric moieties M1 and M2. Also disclosed herein are a method of preparing said multilayer coating system, a coated substrate obtainable therefrom, and a method of using a coating composition including the block copolymer for improving the chromaticity of the multilayer coating system.

19 Claims, No Drawings

(56) References Cited

OTHER PUBLICATIONS

Li et al., "Bottlebrush polymers: From controlled synthesis, self-assembly, properties to applications", Progress in Polymer Science, vol. 116, pp. 1-57 (2021).
Patel et al., "Tunable structural color of bottlebrush block copolymers through direct-write 3D printing from solution", Science Advances, vol. 6, eaaz7202, pp. 1-13 (2020).
International Search Report and Written Opinion for corresponding PCT/EP22/57112, mailed Jul. 27, 2022, 8 pages.

* cited by examiner

MULTILAYER COATING SYSTEMS OBTAINED FROM BLOCK COPOLYMER CONTAINING BASECOAT COMPOSITIONS

CROSS-REFERENCE TO RELATED APPLICATIONS

This application is a U.S. National Phase Application of International Patent Application No. PCT/EP22/057112, filed Mar. 18, 2022, which claims priority to European Patent Application No. 21163605.5, filed Mar. 19, 2021, each of which is hereby incorporated by reference herein.

The present invention relates to a multilayer coating system present on a substrate and comprising at least three coating layers L1, L2 and L3 being different from one another, namely a first pigmented coating layer L1 applied over at least a portion of the substrate, a second coating layer L2 applied over the first pigmented coating layer L1, and a third coating layer L3 applied over the second coating layer L2, wherein the second coating layer L2 is formed from a coating composition comprising at least one block copolymer containing a backbone and at least two blocks B1 and B2 and side chains S1 and S2 comprising different polymeric moieties M1 and M2, a method of preparing said multilayer coating system, a coated substrate obtainable therefrom, and a use of a coating composition comprising the block copolymer for improving, in particular for increasing, the chromaticity of the inventive multilayer coating system.

BACKGROUND OF THE INVENTION

In typical automotive coating processes, usually multiple layers are applied to the surface of a suitable substrate such as a metallic substrate in form of a multilayer coating system: for example, an electrodeposition coat (e-coat), optionally a primer, one or two basecoats, and a topcoat, in particular a clearcoat, as outermost layer, are applied in this sequence. At least the e-coat layer is generally applied to the substrate surface and then cured before any of the further coatings are applied on top. Subsequent to applying and curing at least the electrodeposition coating film, and also subsequent to optionally applying a primer, at least one (first) basecoat formulation, which is usually pigmented, is then applied. Often, a second basecoat is applied on top of the first basecoat film as a further intermediate coating film. Then, a topcoat such as a clearcoat is usually applied, wherein at least the basecoats and the topcoat are nowadays typically applied making use of a wet-on-wet-application. Afterwards the coated substrate is passed through an oven at temperatures to cure at least the basecoat(s) and the topcoat such as the clearcoat simultaneously in a 2C1B or 3C1B process, depending on the number of basecoats. In some cases, also the primer coat—if present—is cured at this stage together with the basecoat(s) and topcoat, in particular clearcoat, e.g. in a 4C1B process.

There are quite a number of requirements necessary, which have to be fulfilled and/or met by the multilayer coatings used in the automotive industry due to regulations, but also due to quality standards set by the automotive industry as such. Thus, the multilayer coatings have to exhibit or display a number of desired characteristics to at least a sufficient extent in order to meet these requirements. For example, an avoidance of optical defects is desired. In addition, and in particular, it is desired that excellent coloristic properties of the multilayer coatings are achieved.

Multilayer coatings composed of at least two coating layers are e.g. disclosed in WO 2020/160299 A1. The first layer is a photonic crystal film comprising a pigment and a block copolymer. The second layer present on the first layer is used as topcoat, and is an optical adhesive or an UV curable resin. The block copolymer is necessarily present in the first layer together with at least one pigment. WO 2020/160299 A1 aims at providing multilayer coatings with good transparency in the visible spectrum. Coating compositions used for preparing pigmented photonic crystal films as such are further disclosed in WO 2020/180427 A1, but no multilayer coatings are disclosed therein, let alone multilayer coatings prepared via a wet-on-wet technique.

As the multilayer coatings known in the state of the art not always exhibit sufficiently good coloristic properties, e.g. with respect to lightness, but particular with respect to chromaticity, there is a need to provide cured coatings and coating systems, which exhibit improved coloristic properties and color values compared to the coatings and coating systems known in the prior art, in particular with respect to their chromaticity and achievement of excellent chroma values. At the same time, these cured coatings and coating systems ought to be prepared in an economically advantageous manner, in particular with respect to as short as possible process times including as short as possible curing times, especially when these coatings and coating systems are used in automotive OEM production.

Problem

It has been therefore an object underlying the present invention to provide multilayer coating systems, which exhibit improved coloristic properties and color values compared to the coatings and coating systems known in the prior art, in particular with respect to their chromaticity and achievement of excellent chroma values, and which, at the same time, can be prepared in an economically advantageous manner, in particular with respect to as short as possible process times including as short as possible curing times, especially when these multilayer coating systems are used in automotive OEM production.

Solution

This object has been solved by the subject-matter of the claims of the present application as well as by the preferred embodiments thereof disclosed in this specification, i.e. by the subject matter described herein.

A first subject-matter of the present invention is a multilayer coating system being present on an optionally precoated substrate and comprising at least three coating layers L1, L2 and L3 being different from one another, namely
- a first pigmented coating layer L1 applied over at least a portion of an optionally pre-coated substrate,
- a second coating layer L2 applied over the first pigmented coating layer L1, and
- a third coating layer L3 applied over the second coating layer L2,
- characterized in that the second coating layer L2 is formed from a coating composition comprising at least one block copolymer containing a backbone and at least two blocks B1 and B2 being different from one another,
  - wherein block B1 comprises at least one kind of side chains S1 attached to the backbone and block B2 comprises at least one kind of side chains S2 attached to the backbone, which are different from side chains S1, wherein each of side chains S1 comprises at least one polymeric moiety M1 being selected from the group consisting of polyester, polyether and poly(meth)acrylate moieties, and each of side chains S2 comprises at least one polymeric moiety M2 being different from polymeric moiety M1 and being selected from the group consisting of polyester, poly(meth)acrylate, polyether, polysiloxane and polystyrene moieties.

A further subject-matter of the present invention is a method for preparing the inventive multilayer coating system comprising at least steps (1), (2), (3) and (4), namely (1) applying a pigmented basecoat composition to at least a portion of an optionally pre-coated substrate and forming a first coating film on at least a portion of the optionally pre-coated substrate, (2) applying a second basecoat composition comprising the at least one block copolymer and being different from the basecoat composition applied in step (1) to the first coating film present on the substrate obtained after step (1) and forming a second coating film, which preferably is adjacent to the first coating film, (3) applying a coating composition different from the compositions applied in steps (1) and (2) to the second coating film present on the substrate obtained after step (2) and forming a third coating film, which is preferably adjacent to the second coating film, wherein said coating composition is preferably a clearcoat composition, and (4) jointly curing at least the second and third coating films applied in steps (2) and (3) and optionally also the first coating film applied in step (1) in case said first coating film was not cured prior to performing of step (2) to obtain the multilayer coating system comprising at least the first, the second and the third coating layers L1, L2 and L3.

A further subject-matter of the present invention is a coated substrate obtainable by the inventive method.

A further subject-matter of the present invention is a use of a coating composition, which comprises the at least one inventively used block copolymer for improving, in particular for increasing, the chromaticity of an inventive multilayer coating system, preferably for improving, in particular increasing, its $C^*_{average}$ chroma value, wherein said $C^*_{average}$ chroma value is the sum of C*-values (chroma values according to the L*C*h color model) measured at angles of 15°, 45° and 110°, divided by three, more preferably for improving, in particular increasing, its $C^*_{average}$ chroma value to an $C^*_{average}$ value of at least 40, preferably of at least 42, more preferably of at least 45, even more preferably of at least 50, yet more preferably of at least 55, in particular of at least 60, in particular when the coating composition is used as a second basecoat composition in step (2) of the inventive method.

The inventively used block copolymer is also referred to as copolymer BBCP hereinafter.

It has been in particular surprisingly found that the inventive multilayer coating systems exhibit improved coloristic properties and color values, in particular when compared to coatings and coating systems known in the prior art. This in particular applies to the chromaticity and achievement of excellent chroma values of these multilayer coating systems. In this regard it has been found that the chromaticity of the multilayer coating systems can be improved, in particular increased, e.g. their $C^*_{average}$ chroma values, wherein said $C^*_{average}$ chroma value is the sum of C*-values (chroma values according to the L*C*h color model) measured at angles of 15°, 45° and 110°, divided by three. It has been found that the $C^*_{average}$ chroma values can be increased to a $C^*_{average}$ value of at least 40, preferably of at least 42, more preferably of at least 45, even more preferably of at least 50, yet more preferably of at least 55, in particular of at least 60.

Further, it has been in particular surprisingly found that the multilayer coating systems can be produced in an economically advantageous manner, in particular with respect to short process times and short curing times, especially when these coatings and coating systems are used in automotive OEM production.

It has been found particularly surprisingly that the aforementioned advantageous effects are a result of the incorporation of a block copolymer BBCP into a coating composition and of using said coating composition as a midcoat composition (second basecoat composition) when preparing the inventive multilayer coating system. It has been further surprisingly found that these effects can be in particular observed in an advantageous manner, when a specific wet-on-wet-application is used for preparing the multilayer coating systems, wherein the applied coating composition comprising the at least one block copolymer BBCP, which is used for preparing the second coating layer L2, and the applied coating composition used for preparing the third coating layer L3 are jointly cured, i.e. simultaneously cured, to obtain the second and third coating layers L2 and L3 of the multilayer coating system.

In particular, it has been surprisingly found that the presence of the third coating layer L3 onto coating layer L2 halts the desired color shift observed with curing: when no coating layer L3 is present on top of coating layer L2—i.e. when the coating composition used for preparing coating layer L2 actually represents a topcoat as uppermost coat—a significant loss of chroma has been found to occur, which is undesired. It has been surprisingly found that applying a third coating layer L3 onto the coating layer L2, especially in a wet-on-wet application, wherein the coating composition used for preparing the third layer L3 is applied before the coating composition comprising the at least one block copolymer BBCP used for preparing coating layer L2 is cured, and subsequent curing of the two resulting films in a joint manner unexpectedly prevents this loss of chroma. These results have been observed for a variety of chemically different third coating layers L3, which is even more surprising.

DETAILED DESCRIPTION OF THE INVENTION

The term "comprising" in the sense of the present invention, in connection for example with the coating compositions used in the inventive method or for preparing the inventive multilayer coating system, preferably has the meaning of "consisting of". With regard, e.g., to the second basecoat composition, it is possible—in addition to all mandatory constituents present therein—for one or more of the further constituents identified hereinafter and included optionally therein to be also included therein. All constituents may in each case be present in their preferred embodiments as identified below.

The proportions and amounts in wt.-% (% by weight) of any of the constituents given hereinafter, which are present in each of the coating compositions add up to 100 wt.-%, based in each case on the total weight of the respective composition.

Each of the coating compositions used in steps (1), (2), and (3) of the inventive method and/or used for preparing coating layers L1, L2 and L3 may contain—besides the constituents outlined in more detail hereinafter—one or more commonly used additives depending on the desired application. For example, each of the coating compositions may comprise independently of one another at least one additive selected from the group consisting of reactive diluents, catalysts, light stabilizers, antioxidants, deaerators, emulsifiers, slip additives, polymerization inhibitors, plasticizers, initiators for free-radical polymerizations, adhesion promoters, flow control agents, film-forming auxiliaries, sag control agents (SCAs), flame retardants, corrosion inhibitors, siccatives, thickeners, biocides and/or matting agents. They can be used in known and customary proportions. Preferably, their content, based on the total weight of each the coating composition is 0.01 to 20.0 wt.-%, more preferably 0.05 to 15.0 wt.-%, particularly preferably 0.1 to 10.0% By weight, most preferably from 0.1 to 7.5% by weight, especially from 0.1 to 5.0% by weight and most preferably from 0.1 to 2.5% by weight.

Each of the coating compositions used in the inventive method, in particular in each of steps (1) to (3), and/or for preparing the multilayer coating system can be aqueous (waterborne) or organic solvent(s) based (solventborne, non-aqueous).

The term "solventborne" or "non-aqueous" is understood preferably for the purposes of the present invention to mean that organic solvent(s), as solvent(s) and/or as diluent(s), is/are present as the main constituent of all solvents and/or diluents present in the respective coating composition such as in the second basecoat composition applied in step (2) of the inventive method if the respective coating composition is solventborne. Preferably, organic solvent(s) are present in an amount of at least 35 wt.-%, based on the total weight of the coating composition. A solventborne coating composition preferably includes an organic solvent(s) fraction of at least 40 wt.-%, more preferably of at least 45 wt.-%, very preferably of at least 50 wt.-%, based in each case on the total weight of the coating composition. All conventional organic solvents known to those skilled in the art can be used as organic solvents. The term "organic solvent" is known to those skilled in the art, in particular from Council Directive 1999/13/ EC of 11 Mar. 1999. Examples of such organic solvents would include heterocyclic, aliphatic, or aromatic hydrocarbons, mono- or polyhydric alcohols, especially methanol and/or ethanol, ethers, esters, ketones, and amides, such as, for example, N-methylpyrrolidone, N-ethylpyrrolidone, dimethylformamide, toluene, xylene, butanol, ethyl glycol and butyl glycol and also their acetates, butyl diglycol, diethylene glycol dimethyl ether, cyclohexanone, methyl ethyl ketone, methyl isobutyl ketone, acetone, isophorone, or mixtures thereof. A solventborne coating composition preferably is free or essentially free of water. The term "essentially" in this context preferably means that no water is added on purpose when preparing the coating composition.

The term "waterborne" or "aqueous" is understood preferably for the purposes of the present invention to mean that water is present as the main constituent of all solvents and/or diluents present an aqueous coating composition such as the first basecoat composition applied in step (1) of the inventive method. Preferably, water is present in an amount of at least 35 wt.-%, based on the total weight of the coating composition. An aqueous coating composition preferably includes a water fraction of at least 40 wt.-%, more preferably of at least 45 wt.-%, very preferably of at least 50 wt.-%, based in each case on the total weight of the coating composition. The fraction of organic solvent(s) is preferably <20 wt.-%, more preferably in a range of from 0 to <20 wt.-%, very preferably in a range of from 0.5 to 20 wt.-% or to 17.5 wt.-% or to 15 wt.-% or to 10 wt.-%, based in each case on the total weight of the coating composition.

Inventive Multilayer Coating System

The inventive multilayer coating system is present on an optionally pre-coated substrate and comprises at least three coatings layers L1, L2 and L3 being different from one another.

Preferably, at least the second and the third coating layers L2 and L3 are positioned adjacently to each other. More preferably, also the first and the second coating layers L1 and L2 are positioned adjacently to each other.

Preferably, the multilayer coating system, preferably after curing, has an $C^*_{average}$ value of at least 40, more preferably of at least 42, even more preferably of at least 45, still more preferably of at least 50, yet more preferably of at least 55, in particular of at least 60, the $C^*_{average}$ value being the sum of C*-values (chroma values according to the L*C*h color model) measured at angles of 15°, 45° and 110°, divided by three. The method for measuring the chroma values is described in the 'Methods' section hereinafter.

Preferably, the multilayer coating system is obtainable by a method, according to which at least the applied coating composition comprising the at least one block copolymer BBCP, which is used for preparing the second coating layer L2, and the applied coating composition used for preparing the third coating layer L3 are jointly cured to obtain the second and third coating layers L2 and L3 of the multilayer coating system.

Curing is preferably selected from chemical curing such as chemical crosslinking, radiation curing, and/or physically drying (non-chemical curing), in each case at room temperature or at an elevated temperature, more preferably is selected from chemical curing such as chemical crosslinking, and/or physically drying (non-chemical curing), in each case at room temperature or at an elevated temperature, in each case preferably wherein the minimum curing temperature applied for curing is 80° C.

Substrate

The inventive multilayer coating system is particularly suitable as a coating of automotive vehicle bodies or parts thereof including respective metallic substrates, but also plastic substrates such as polymeric substrates. Consequently, the preferred substrates are automotive vehicle bodies or parts thereof.

Suitability as metallic substrates used in accordance with the invention are all substrates used customarily and known to the skilled person. The substrates used in accordance with the invention are preferably metallic substrates, more preferably selected from the group consisting of steel, preferably steel selected from the group consisting of bare steel, cold rolled steel (CRS), hot rolled steel, galvanized steel such as hot dip galvanized steel (HDG), alloy galvanized steel (such as, for example, Galvalume, Galvannealed or Galfan) and aluminized steel, aluminum and magnesium, and also Zn/Mg alloys and Zn/Ni alloys. Particularly suitable substrates are parts of vehicle bodies or complete bodies of automobiles for production.

Preferably, thermoplastic polymers are used as plastic substrates. Suitable polymers are poly(meth)acrylates including polymethyl(meth)acrylates, polybutyl (meth)acrylates, polyethylene terephthalates, polybutylene terephthalates, polyvinylidene fluorides, polyvinyl chlorides, polyesters, including polycarbonates and polyvinyl acetate, polyamides, polyolefins such as polyethylene, polypropylene, polystyrene, and also polybutadiene, polyacrylonitrile, polyacetal, polyacrylonitrile-ethylene-propylene-diene-styrene copolymers (A-EPDM), ASA (acrylonitrile-styrene-acrylic ester copolymers) and ABS (acrylonitrile-butadiene-styrene copolymers), polyetherimides, phenolic resins, urea resins, melamine resins, alkyd resins, epoxy resins, polyurethanes, including TPU, polyetherketones, polyphenylene sulfides, polyethers, polyvinyl alcohols, and mixtures thereof. Polycarbonates and poly(meth)acrylates are especially preferred.

The substrate used in accordance with the invention is preferably a metallic substrate pretreated with at least one metal phosphate such as zinc phosphate and/or pretreated with at least one an oxalate. A pretreatment of this kind by means of phosphating, which takes place normally after the substrate has been cleaned and before the substrate is electrodeposition-coated, is in particular a pretreatment step that is customary in the automobile industry.

As outlined above the substrate used may be a pre-coated substrate, i.e. a substrate bearing at least one cured coating film. The substrate can be pre-coated with a cured electrodeposition coating layer. The substrate can, e.g., be provided additionally or alternatively with at least one cured or uncured primer coating film as at least one additional pre-coat. The term "primer" is known to a person skilled in the art. A primer typically is applied after the substrate has been provided with a cured electrodeposition coating layer. In case a cured primer coating film is present, the cured electrodeposition coating film is present underneath and preferably adjacent to the cured primer coating film. Curing of this primer may take place at temperatures in the range of from 40 to 140° C. and may in particular include a "low baking" step at a temperature in the range of from 80 to 100° C. As outlined above a substrate provided with an uncured primer coating film may also be used, in particular a substrate such as a metallic substrate bearing a cured electrodeposition coating film, onto which said uncured primer coating film is present. Thus, a primer composition can be applied to an optionally pre-coated substrate and forming a primer coating film on the optionally pre-coated substrate. Then, an optional curing step of this primer coating film is possible. Then, a coating composition used for forming the first coating layer L1 can be subsequently applied before or after curing of said primer coating film has taken place, optionally and preferably after a flash-off period such as a flash-off period of 1 to 20 minutes, preferably at a temperature not exceeding 40° C., such as at a temperature in the range of from 18 to 30° C.

Coating Layer L1 and Coating Composition Used for Forming Said Layer

The first coating layer L1 is pigmented and applied over at least a portion of an optionally pre-coated substrate. Thus, the first coating layer L1 is present on at least part of a surface of an optionally pre-coated substrate.

Preferably, the first pigmented coating layer L1 is capable of absorbing at least those wavelengths that are not reflected by the second layer L2.

The first coating layer L1 is preferably formed from a pigmented coating composition. This coating composition is also referred to herein as first basecoat composition or as first pigmented basecoat composition and is the composition used in step (1) of the inventive method.

The first basecoat composition is preferably an aqueous, i.e. waterborne, coating composition, or is a solventborne basecoat composition. In particular, it is a solventborne basecoat composition. The first basecoat composition can be 1K-(one-component) or 2K-(two components) composition. Preferably, it is a 1K-composition.

The term "basecoat" is known in the art and, for example, defined in Römpp Lexikon, paints and printing inks, Georg Thieme Verlag, 1998, 10th edition, page 57. A basecoat is therefore in particular used in automotive painting and general industrial paint coloring in order to give a coloring and/or an optical effect by using the basecoat as an intermediate coating composition.

Preferably, the first basecoat composition comprises at least one white, black and/or coloring pigment, more preferably at least one black pigment, in particular at least one inorganic and/or organic black pigment.

The term "pigment" is known to the skilled person, from DIN 55943 (date: October 2001), for example. A "pigment" in the sense of the present invention refers preferably to a constituent in powder or flake form which is substantially, preferably entirely, insoluble in the medium surrounding them, such as in one of the inventively used coating compositions, for example. Pigments are preferably colorants and/or substances which can be used as pigment on account of their magnetic, electrical and/or electromagnetic properties. Pigments differ from "fillers" preferably in their refractive index, which for pigments is ≥1.7. The term "filler" is known to the skilled person, from DIN 55943 (date: October 2001), for example. Pigments can be inorganic or organic. Black pigments, in particular organic and/or inorganic black pigments are preferred.

If at least one organic black pigment is present in the first basecoat composition, it is preferably at least one IR-transparent organic black pigment, in particular at least one perylene and/or azomethine pigment. Most preferred are black pigments nos. 31 and 32 (P.B. 31 and P.B. 32) as organic black pigments. If at least one inorganic black pigment is present in the first basecoat composition, it is preferably at least one carbon black pigment.

An aqueous or non-aqueous pigment paste comprising the at least one pigment is preferably used for preparing the first basecoat composition, depending on whether the first basecoat composition is solventborne or aqueous.

Preferably, the at least one pigment present in the first basecoat composition is contained therein in an amount in the range of from 5 to 30 wt.-%, more preferably of from 6.0 to 25.0 wt.-%, even more preferably of from 7.5 to 20 wt.-%, in particular of from 8.0 to 16 wt.-%, in each case based on the total solid content of the first basecoat composition.

Preferably, the total solid content of the first basecoat composition is in the range of from 10 to 65 wt.-%, more preferably of from 15 to 60 wt.-%, even more preferably of from 20 to 50 wt.-%, in particular of from 25 to 45 wt.-%, in each case based on the total weight of the first basecoat composition. The method for measuring the solid content (non-volatile content) is described in the 'Methods' section hereinafter.

The first basecoat composition preferably comprises—besides the at least one pigment—at least one binder, more preferably at least one polymer (a1) as binder.

For the purposes of the present invention, the term "binder" is understood in accordance with DIN EN ISO 4618 (German version, date: March 2007) to be the non-volatile constituent of a coating composition, which is responsible for the film formation. The term includes cross-linkers and additives if these represent non-volatile constituents. Pigments and/or fillers contained therein are thus not subsumed under the term "binder". Preferably, the at least one polymer (a1) is the main binder of the coating composition. As the main binder in the present invention, a binder component is preferably referred to, when there is no other binder component in the coating composition, which is present in a higher proportion based on the total weight of the coating composition.

The term "polymer" is known to the person skilled in the art and, for the purposes of the present invention, encompasses polyadducts and polymerizates as well as polycondensates. The term "polymer" includes both homopolymers and copolymers.

Preferably, the first basecoat composition is free of a copolymer BBCP as present in the coating composition used for forming coating layer L2. Thus, preferably, the first basecoat composition does not comprise any polymer that is a copolymer BBCP.

The at least one polymer used as constituent (a1) may be self-crosslinking or non-self-crosslinking. Suitable polymers which can be used are, for example, known from EP 0 228 003 A1, DE 44 38 504 A1, EP 0 593 454 B1, DE 199 48 004 A1, EP 0 787 159 B1, DE 40 09 858 A1, DE 44 37 535 A1, WO 92/15405 A1 and WO 2005/021168 A1.

The at least one polymer used as constituent (a1) is preferably selected from the group consisting of polyurethanes, polyureas, polyesters, polyamides, polyethers, poly (meth)acrylates and/or copolymers of the structural units of said polymers, in particular polyurethane-poly(meth)acrylates and/or polyurethane polyureas. The at least one polymer used as constituent (a1) is particularly preferably selected from the group consisting of polyurethanes, polyesters, poly(meth)acrylates and/or copolymers of the structural units of said polymers. The term "(meth) acryl" or "(meth) acrylate" in the context of the present invention in each case comprises the meanings "methacrylic" and/or "acrylic" or "methacrylate" and/or "acrylate".

Preferred polyurethanes are described, for example, in German patent application DE 199 48 004 A1, page 4, line 19 to page 11, line 29 (polyurethane prepolymer B1), in European patent application EP 0 228 003 A1, page 3, line 24 to page 5, Line 40, European Patent Application EP 0 634 431 A1, page 3, line 38 to page 8, line 9, and international patent application WO 92/15405, page 2, line 35 to page 10, line 32.

Preferred polyethers are, e.g., described in WO 2017/097642 A1 and WO 2017/121683 A1.

Preferred polyesters are described, for example, in DE 4009858 A1 in column 6, line 53 to column 7, line 61 and column 10, line 24 to column 13, line 3 or WO 2014/033135 A2, page 2, line 24 to page 7, line 10 and page 28, line 13 to page 29, line 13 described. Likewise preferred polyesters are polyesters having a dendritic structure or star-shaped structure, as described, for example, in WO 2008/148555 A1.

Preferred polyurethane-poly(meth)acrylate copolymers (e.g., (meth)acrylated polyurethanes)) and their preparation are described, for example, in WO 91/15528 A1, page 3, line 21 to page 20, line 33 and in DE 4437535 A1, page 2, line 27 to page 6, line 22 described.

Preferred (meth)acrylic copolymers are OH-functional. Hydroxyl-containing monomers include hydroxy alkyl esters of acrylic or methacrylic acid, which can be used for preparing the copolymer. Non-limiting examples of hydroxyl-functional monomers include hydroxyethyl(meth) acrylate, hydroxypropyl(meth)acrylates, hydroxybutyl-(meth)acrylates, hydroxyhexyl(meth)-acrylates, propylene glycol mono(meth)acrylate, 2,3-dihydroxypropyl(meth) acrylate, pentaerythritol mono(meth)acrylate, polypropylene glycol mono(meth)acrylates, polyethylene glycol mono (meth)acrylates, reaction products of these with epsilon-caprolactone, and other hydroxyalkyl-(meth)acrylates having branched or linear alkyl groups of up to about 10 carbons, and mixtures of these. Hydroxyl groups on a vinyl polymer such as an (meth)acrylic polymer can be generated by other means, such as, for example, the ring opening of a glycidyl group, for example from copolymerized glycidyl methacrylate, by an organic acid or an amine. Hydroxyl functionality may also be introduced through thio-alcohol compounds, including, without limitation, 3-mercapto-1-propanol, 3-mercapto-2-butanol, 11-mercapto-1-undecanol, 1-mercapto-2-propanol, 2-mercaptoethanol, 6-mercapto-1-hexanol, 2-mercaptobenzyl alcohol, 3-mercapto-1,2-proanediol, 4-mercapto-1-butanol, and combinations of these. Any of these methods may be used to prepare a useful hydroxyl-functional (meth)acrylic polymer. Examples of suitable comonomers that may be used include, without limitation, α,β-ethylenically unsaturated monocarboxylic acids containing 3 to 5 carbon atoms such as acrylic, methacrylic, and crotonic acids and the alkyl and cycloalkyl esters, nitriles, and amides of acrylic acid, methacrylic acid, and crotonic acid; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic alcohols containing 1 to 20 carbon atoms, such as methyl, ethyl, propyl, isopropyl, n-butyl, isobutyl, tert-butyl, hexyl, 2-ethylhexyl, dodecyl, 3,3,5-trimethylhexyl, stearyl, lauryl, cyclohexyl, alkyl-substituted cyclohexyl, alkanol-substituted cyclohexyl, such as 2-tert-butyl and 4-tert-butyl cyclohexyl, 4-cyclohexyl-1-butyl, 2-tert-butyl cyclohexyl, 4-tert-butyl cyclohexyl, 3,3,5,5, -tetramethyl cyclohexyl, tetrahydrofurfuryl, and isobornyl acrylates, methacrylates, and crotonates; unsaturated dialkanoic acids and anhydrides such as fumaric, maleic, itaconic acids and anhydrides and their mono- and diesters with alcohols such as methanol, ethanol, propanol, isopropanol, butanol, isobutanol, and tert-butanol, like maleic anhydride, maleic acid dimethyl ester and maleic acid monohexyl ester; vinyl acetate, vinyl propionate, vinyl ethyl ether, and vinyl ethyl ketone; styrene, a-methyl styrene, vinyl toluene, 2-vinyl pyrrolidone, and p-tert-butylstyrene. The (meth)acrylic copolymer may be prepared using conventional techniques, such as by heating the monomers in the presence of a polymerization initiating agent and optionally a chain transfer agent.

Suitable poly(meth)acrylates are also those which can be prepared by multistage free-radical emulsion polymerization of olefinically unsaturated monomers in water and/or organic solvents. Examples of seed-core-shell polymers (SCS polymers) obtained in this manner are disclosed in WO 2016/116299 A1.

Preferred polyurethane-polyurea copolymers are polyurethane-polyurea particles, preferably those having a Z-average particle size of 40 to 2000 nm, the polyurethane-polyurea particles, each in reacted form, containing at least one isocyanate group-containing polyurethane prepolymer containing anionic and/or groups which can be converted into anionic groups and at least one polyamine containing two primary amino groups and one or two secondary amino groups. Preferably, such copolymers are used in the form of an aqueous dispersion. Such polymers can in principle be prepared by conventional polyaddition of, for example, polyisocyanates with polyols and polyamines.

The polymer used as constituent (a1) preferably has reactive functional groups which enable a crosslinking reaction. Any common crosslinkable reactive functional group known to those skilled in the art can be present. Preferably, the polymer used as constituent (a1) has at least one kind of functional reactive groups selected from the group consisting of primary amino groups, secondary amino groups, hydroxyl groups, thiol groups, carboxyl groups and carbamate groups. Preferably, the polymer used as constituent (a1) has functional hydroxyl groups and/or carbamate groups.

Preferably, the polymer used as constituent (a1) is hydroxyl-functional and more preferably has an OH number in the range of 15 to 400 mg KOH/g, more preferably from 20 to 250 mg KOH/g.

The polymer used as constituent (a1) is particularly preferably a hydroxyl-functional polyurethane-poly (meth) acrylate copolymer, a hydroxyl-functional polyester and/or a hydroxyl-functional polyurethane-polyurea copolymer.

In addition, the first basecoat composition may contain at least one typical crosslinking agent known per se. Crosslinking agents are to be included among the film-forming non-volatile components of a coating composition, and therefore fall within the general definition of the "binder". Crosslinking agents are thus to be subsumed under the constituent (a1).

All conventional crosslinking agents can be used. This includes melamine resins, preferably melamine aldehyde resins, more preferably melamine formaldehyde resins, blocked polyisocyanates, polyisocyanates having free (unblocked) isocyanate groups, crosslinking agents having amino groups such as secondary and/or primary amino groups, and crosslinking agents having epoxide groups and/or hydrazide groups, as well as crosslinking agents having carbodiimide groups, as long as the functional groups of the particular crosslinking agent are suitable to be reacted with the crosslinkable functional groups of the film-forming polymers used as binders in a crosslinking reaction. For example, a crosslinking agent having blocked or free isocyanate groups can be reacted with a film-forming polymer having crosslinkable OH-groups and/or amino groups at elevated temperatures in case of 1K formulations and at ambient temperature in case of 2K formulations.

If a crosslinking agent is present, it is preferably at least one aminoplast resin and/or at least one blocked or free polyisocyanate, preferably an aminoplast resin. Among the aminoplast resins, melamine resins such as melamine formaldehyde resins are particularly preferred. Preferably, the melamine aldehyde resins, preferably the melamine formaldehyde resins, in each case bear at least one of imino groups, alkykol groups and etherified alkylol groups as functional groups, which are reactive towards the functional groups of polymer P1. Examples of alkylol groups are methylol groups.

Coating Layer L2 and Coating Composition Used for Forming Said Layer

The second coating layer L2 is applied over the first pigmented coating layer L1. The second coating layer L2 is thus preferably positioned above coating layer L1. The second coating layer L2 is formed from a coating composition comprising at least one block copolymer BBCP. This coating composition is also referred to herein as second basecoat composition and is the composition used in step (2) of the inventive method.

The second basecoat composition may be an aqueous, i.e. waterborne, coating composition. The second basecoat composition may alternatively be a solventborne basecoat composition. In particular, it is, in fact, a solventborne basecoat composition. The basecoat composition can be 1K-(one-component) or 2K-(two components) composition. Preferably, it is a 1K-composition.

Preferably, the second basecoat composition is free of pigments. Preferably, the second basecoat composition is free of fillers, most preferably is free of both pigments and fillers. Alternatively, however, the coating composition comprising the at least one block copolymer BBCP is a pigmented coating composition.

Preferably, the second basecoat composition) is a solventborne coating composition, which is preferably free of pigments.

Preferably, the total solid content of the second basecoat composition is in a range of from 15 to 70 wt.-%, more preferably of from 20 to 65 wt.-%, even more preferably of from 25 to 60 wt.-%, in particular of from 30 to 55 wt.-%, in each case based on the total weight of the second basecoat composition. The method for measuring the solid content (non-volatile content) is described in the 'Methods' section hereinafter.

The second basecoat composition necessarily comprises at least one block copolymer BBCP. As already outlined above, the inventively used block copolymer is also referred to as copolymer BBCP hereinafter and hereinbefore.

Preferably, the at least one copolymer BBCP is present in the coating composition used for preparing the second coating layer L2 in an amount in the range of from 10 to 100 wt.-%, more preferably of from 15 to 100 wt.-%, even more preferably of from 20 to 95 wt.-%, based in each case on the total solid content of the coating composition.

The at least one block copolymer BBCP contains a backbone and at least two blocks B1 and B2 being different from one another. Block B1 comprises at least one kind of side chains S1 attached to the backbone and block B2 comprises at least one kind of side chains S2 attached to the backbone, which are different from side chains S1. Since each of the side chains S1 and S2 is attached to the backbone of the inventively used copolymer BBCP and said copolymer is necessarily a block copolymer comprising the at least two blocks B1 and B2, wherein block B1 in turn comprises aforementioned side chains S1 and block B2 in turn comprises aforementioned side chains S2, it is clear that at least the part of the backbone of the inventively used copolymer, to which the side chains S1 are attached to, is also part of block B1, and that at least the part of the backbone of the inventively used copolymer, to which the side chains S2 are attached to, is also part of block B2. It is further clear that the part of block B1, which does not constitute the at least one kind of side chains S1, but to which the side chains S1 are attached to, constitutes part of the backbone of the copolymer, and that the part of block B2, which does not constitute the at least one kind of side chains S2, but to which the side chains S2 are attached to, constitutes also part of the backbone of the copolymer. Each of side chains S1 comprises at least one polymeric moiety M1 being selected from the group consisting of polyester, polyether and poly (meth)acrylate moieties, and each of side chains S2 comprises at least one polymeric moiety M2 being different from polymeric moiety M1 and being selected from the group consisting of polyester, poly(meth)acrylate, polyether, polysiloxane and polystyrene moieties. The side chains S1 and S2 are preferably covalently attached to the backbone of the block copolymer BBCP. The backbone (main chain) of copolymer BBCP preferably comprises ethylenically unsaturated carbon-carbon double bonds, but does not necessarily have to.

Copolymer BBCP is preferably obtainable by ring-opening metathesis polymerization (ROMP) using cyclic ethylenically unsaturated, preferably cyclic olefinic, monomers. ROMP is a specific olefin metathesis chain growth polymerization. The driving force of this reaction is relief of ring strain in cyclic olefins (e.g. norbornene or cyclopentene monomers).

Preferably, the backbone of copolymer BBCP comprises olefinic carbon-carbon double bonds, more preferably arranged in a regular and/or repeating pattern, even more preferably in a manner such that each structural unit described hereinafter is covalently linked to another structural unit via a carbon-carbon double bond. These double bonds are preferably formed during ROMP. If copolymer BBCP is obtained in this manner, i.e. by ROMP, the formed carbon-carbon double bonds present within the backbone may be optionally hydrogenated to saturated carbon bonds such as alkylene moieties afterwards.

A person skilled in the art is aware of methods of preparing copolymers BBCP, in particular of such copolymers prepared via ROMP: copolymers BBCP as such are known and are, e.g., disclosed in WO 2020/160299 A1, WO 2020/180427 A1 as well as in B.R. Sveinbjörnsson et al., PNAS 2012, 109 (36), p. 14332-14336. The preparation of copolymers BBCP is also described in these references and, in case of the cited journal article, also in its supporting information.

Block copolymer BBCP is preferably a linear block copolymer. Block copolymer BBCP preferably has a block-like sequence of copolymerized structural units derived at least partially from suitable ethylenically unsaturated monomers, preferably cyclic olefins. Preferably, no (meth)acrylic monomers are used for preparing block copolymer BBCP.

Block copolymer BBCP comprises at least two blocks and is thus at least a diblock copolymer, more preferably a linear diblock copolymer. However, copolymer BBCP may comprise additional block(s), e.g. may as well be a triblock copolymer.

Block copolymers are copolymers obtained by adding at least two different ethylenically unsaturated monomers, two different mixtures of ethylenically unsaturated monomers or by adding an ethylenically unsaturated monomer and a mixture of ethylenically unsaturated monomers at different times in the practice of a controlled polymerization, wherein an ethylenically unsaturated monomer or a mixture of ethylenically unsaturated monomers is initially charged at the start of the reaction. At the time of adding the further ethylenically unsaturated monomer or the mixture of ethylenically unsaturated monomers or adding ethylenically unsaturated monomers in multiple installments, the ethylenically unsaturated monomers added at the start of the polymerization can be already completely reacted, or still be partly non-polymerized. As a result of such a polymerization, block copolymers may have at least one transition in their structural units along the polymer chain (polymer backbone), said transition marking the boundary between the individual blocks. Suitable block copolymer structures are e.g. AB diblock copolymers, ABA triblock copolymers or ABC triblock copolymers. Block copolymers, which are preferably used according to the present invention, contain blocks having a minimum number of two structural units per block.

Preferably, block copolymer BBCP is of the type A-B, A-B-A, B-A-B, A-B-C and/or A-C-B, in which the A, B and C blocks represent a differing composition of structural units, wherein the blocks A, B and C differ in their respective composition of structural units and/or wherein the amount of structural units in two adjacent blocks differs from each other by more than 5% by weight in each case. Most preferred are, however, AB diblock copolymers.

Preferably, the at least one copolymer BBCP present in the second basecoat composition has a number average molecular weight ($M_n$) in a range of from 450 to 3000 kDa, more preferably in a range of from 500 to 2500 kDa, even more preferably in a range of from 550 to 2000 kDa, still more preferably in a range of from 600 to 1500 kDa, in particular in a range of from 650 to 1000 kDa.

The method for measuring the number average molecular weight ($M_n$) as well as for measuring the weight average molecular weight ($M_w$) and the polydispersity index (PDI) is described in the 'Methods' section hereinafter.

As mentioned hereinbefore each of side chains S1 comprises at least one polymeric moiety M1 being selected from the group consisting of polyester, polyether and poly(meth)acrylate moieties, and each of side chains S2 comprises at least one polymeric moiety M2 being different from polymeric moiety M1 and being selected from the group consisting of polyester, poly(meth)acrylate, polyether, polysiloxane and polystyrene moieties.

Preferably, the side chains are not introduced into copolymer BBCP after it has already been polymerized in polymer analogous reaction. Rather, the side chains are preferably introduced into suitable monomers used for the polymerization reaction to prepare copolymer BBCP. As these monomers bear the aforementioned polymeric moieties the corresponding monomers represent macromonomers.

Preferably, cyclic olefins are used for preparing copolymer BBCP, more preferably norbornene or cyclopentene monomers. Polymeric moieties such as M1 and M2 can be introduced into such monomers for instance by using norbornene or cyclopentene monomers having at least one functional group such as a carboxylic acid group and/or a hydroxyl group. Examples of suitable norbornene monomers are (A)

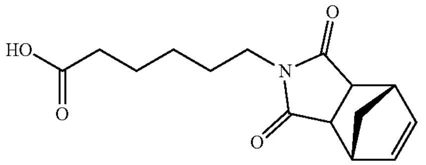

and (B)

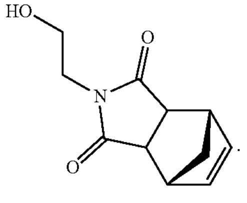

For example, (B) can be used as initiator alcohol for a polymerization such as a tin-catalyzed polymerization of lactide such as racemic lactide to yield a polylactide macromonomer having both an OH-functional terminal group and being norbornene functionalized at its other end. The polylactide unit represents a polyester moiety as an example of polymeric moiety M1. The norbornene moiety can then be used in ROMP to prepare copolymer BBCP. The preparation of such a macromonomer is e.g. described in the supporting information of B.R. Sveinbjörnsson et al., PNAS 2012, 109 (36), p. 14332-14336. Monomer (A) can also be used for preparing suitable macromonomers suitable for ROMP. For example, a polymer such as polystyrene can be prepared having a terminal OH-group. Said terminal OH-group of this formed precursor can then be transformed into an ester bond via a reaction with (A) to yield a suitable macromonomer bearing a polystyrene moiety as polymeric moiety M2. The preparation of such a macromonomer is e.g. described in example 2 of WO 2020/180427 A1.

Preferably, each of side chains S1 of the first block B1 of copolymer BBCP comprises at least one polymeric moiety M1, which contains at least one preferably terminal hydroxyl group, wherein polymeric moiety M1 is preferably selected from the group consisting of preferably aliphatic polyester moieties, and preferably aliphatic polyether moieties, in particular represents a polylactide moiety, and, also preferably, each of side chains S2 of the second block B2 of copolymer BBCP comprises at least one polymeric moiety M2, which is free from both hydroxyl and carboxylic acid groups, wherein polymer moiety M2 is preferably selected from the group consisting of polyether, polysiloxane and polystyrene moieties, in particular represents a polystyrene moiety.

Preferably, the first block B1 of copolymer BBCP comprises at least one structural unit SU1a and optionally at least one structural unit SU1b, wherein structural unit SU1a is represented by at least one of part structures PS1a-1 and PS1a-2, and wherein optionally present structural unit SU1b is represented by part structure PS1b, wherein all structural units present in the first block are preferably arranged randomly within the first block B1 of copolymer BBCP (PS1a-1)

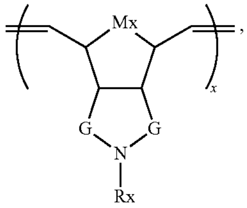

, (PS1a-2)

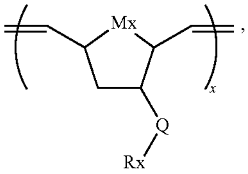

, (PS1b)

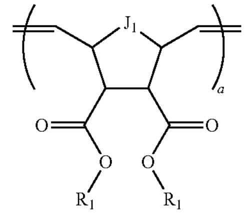

, wherein independently of one another parameter x is in a range of from 1 to 1000, preferably of from 1 to 750, more preferably of from 2 to 500, even more preferably of from 3 to 300, parameter a is in a range of from 0 to 1000, preferably of from 1 to 750, more preferably of from 2 to 500, even more preferably of from 3 to 300, the relative ratio of parameters x:a is in a range of from 1:0 to 1:3, preferably of from 2:1 to 1:2, Mx, $J_1$ and G represent independently of one another $CH_2$ or C═O, Q represents a divalent alkyl, heteroalkyl, cycloalkyl, heterocycloalkyl, aryl or heteroaryl residue, Rx represents side chain S1 comprising polymeric moiety M1, preferably represents $C_2$-$C_6$-alkylene-O—[C(═O)—$C_2$-$C_6$-alkylene-O]$_n$—H, wherein parameter n is in a range of from 1 to 500, preferably of from 1 to 300, and $R_1$ represents a $C_1$-$C_6$-alkyl residue, preferably an unbranched $C_1$-$C_6$-alkyl residue.

Preferably, the second block B2 of copolymer BBCP comprises at least one structural unit SU2a and optionally at least one structural unit SU2b, wherein structural unit SU2a is represented by at least one of part structures PS2a-1 and PS2a-2, and wherein optionally present structural unit SU2b is represented by part structure PS2b, wherein all structural units present in the second block preferably are arranged randomly within the second block B2 of copolymer BBCP (PS2a-1)

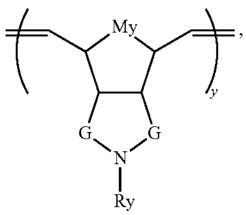

, (PS2a-2)

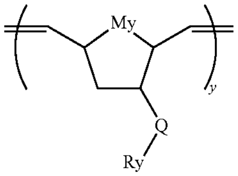

, (PS2b)

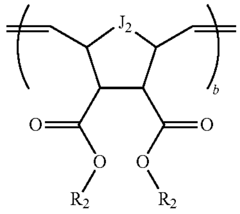

, wherein independently of one another parameter y is in a range of from 1 to 1000, preferably of from 1 to 750, more preferably of from 2 to 500, even more preferably of from 3 to 300, parameter b is in a range of from 0 to 1000, preferably of from 1 to 750, more preferably of from 2 to 500, even more preferably of from 3 to 300, the relative ratio of parameters y:b is in a range of from 1:0 to 1:3, preferably of from 2:1 to 1:2, My, $J_2$ and G represent independently of one another $CH_2$ or C═O, Q represents a divalent alkyl, heteroalkyl, cycloalkyl, heterocycloalkyl, aryl or heteroaryl residue, Ry represents side chain S2 comprising polymeric moiety M2, preferably represents $C_1$-$C_8$-alkylene-Z-T, wherein Z denotes C(═O)—O or a divalent N-containing heterocyclic residue, and T represents a $C_1$-$C_4$-alkylene residue, to which a polystyrene moiety is bonded, and $R_2$ represents a $C_1$-$C_6$-alkyl residue, preferably a branched $C_1$-$C_6$-alkyl residue.

Preferably, parameters a and b are each independently 1-300, 5-50, 50-100, 100-150, 150-200, 200-250, 250-300, 300-400, 400-500, 500-600, 600-700, 700-800, 800-900, or 900-1000. Preferably, x and y are each independently 1-300, 5-50, 50- 100, 100-150, 150-200, 200-250, 250-300, 300-400, 400-500, 500-600, 600-700, 700-800, 800-900, or 900-1000. Preferably, the ratio of x:a is 1:0.5 to 1:1, 1:1.5, 1:2, or to 1:2.5. Preferably, the ratio of y:b is 1:0.5 to 1:1, 1:1.5, 1:2, or to 1:2.5.

Preferably, a+x+b+y is in a range of from 100 to 500, more preferably of from 120 to 480, even more preferably of from 140 to 400, still more preferably of from 160 to 350, in particular of from 180 to 300.

The term "alkyl" refers to a branched or unbranched hydrocarbon having, for example, from 1-20 carbon atoms, and often 1-12, 1-10, 1-8, 1-6, or 1-4 carbon atoms; or for example, a range between 1-20 carbon atoms, such as 2-6, 3-6, 2-8, or 3-8 carbon atoms. Examples include, but are not limited to, methyl, ethyl, 1-propyl, 2-propyl, 1-butyl, 2-methyl-1-propyl {isobutyl), 2-butyl (sec-butyl), 2-methyl-2-propyl (I-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl- 3-pentyl, 2-methyl-3-pentyl, 2,3-dimethyl-2-butyl, 3,3-dimethyl-2-butyl, hexyl, octyl, decyl, and dodecyl. The alkyl can be unsubstituted or substituted. The term "heterooalkyl" is preferably understood to be an alkyl as defined above with at least one heteroatom selected from nitrogen, sulfur, oxygen, and/or at least one heteroatom containing group. The term "cycloalkyl" preferably refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, or multiple ring structures such as adamantyl. The cycloalkyl can be unsubstituted or substituted. The cycloalkyl group can be monovalent or divalent and can be optionally substituted as described for alkyl groups. The cycloalkyl group can optionally include one or more cites of unsaturation, for example, the cycloalkyl group can include one or more carbon-carbon double bonds. The term "heterocycloalkyl" preferably refers to a saturated or partially saturated monocyclic, bicyclic, or polycyclic ring containing at least one heteroatom selected from nitrogen, sulfur, oxygen, preferably from 1 to 3 heteroatoms in at least one ring. Each ring is preferably from 3 to 10 membered, more preferably 4 to 7 membered. Examples of suitable heterocycloalkyls include pyrrolidyl, tetrahydrofuryl, tetrahydrothiofuranyl, piperidyl, piperazyl, tetrahydropyranyl, morpholino, 1,3-diazapane, 1,4-diazapane, 1,4-oxazepane, and 1,4-oxathiapane. The group may be a terminal group or a bridging group. The term "aryl" preferably refers to an aromatic hydrocarbon group. The aryl group can have from 6 to 30 carbon atoms, for example, about 6-10 carbon atoms. Alternatively, the aryl group can have 6 to 60 carbons atoms, 6 to 120 carbon atoms, or 6 to 240 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, and biphenyl. The aryl can be unsubstituted or optionally substituted. The term "heteroaryl" preferably refers to a monocyclic, bicyclic, or tricyclic ring system containing one, two, or three aromatic rings and containing at least one nitrogen, oxygen, or sulfur atom and/or a heteroatom containing group in an aromatic ring. The heteroaryl can be unsubstituted or substituted, for example, with one or more, and in particular one to three, substituents. Typical heteroaryl groups contain 2-20 carbon atoms in the ring skeleton in addition to the one or more heteroatoms. Examples of heteroaryl groups include, but are not limited to, 2H-pyrrolyl, 3H-indolyl, 4H-quinolizinyl, acridinyl, benzo[b]thienyl, benzothiazolyl, b-carbolinyl, carbazolyl, chromenyl, cinnolinyl, dibenzo[b,d]furanyl, furazanyl, furyl, imidazolyl, imidizolyl, indazolyl, indolisinyl, indolyl, isobenzofuranyl, isoindolyl, isoquinolyl, isothiazolyl, isoxazolyl, naphthyridinyl, oxazolyl, perimidinyl, phenanthridinyl, phenanthrolinyl, phenarsazinyl, phenazinyl, phenothiazinyl, phenoxathiinyl, phenoxazinyl, phthalazinyl, pteridinyl, purinyl, pyranyl, pyrazinyl, pyrazolyl, pyridazinyl, pyridyl, pyrimidinyl, pyrrolyl, quinazolinyl, quinolyl, quinoxalinyl, thiadiazolyl, thianthrenyl, thiazolyl, thienyl, triazolyl, tetrazolyl, and xanthenyl. Preferably, "heteroaryl" denotes a monocyclic aromatic ring containing five or six ring atoms containing carbon and 1, 2, 3, or 4 heteroatoms independently selected from non-peroxide oxygen, sulfur, and N(Z) wherein Z is absent or is H, O, alkyl, aryl, or ($C_1$-$C_6$)alkylaryl. Heteroaryl may also denote an ortho-fused bicyclic heterocycle of about eight to ten ring atoms derived therefrom, particularly a benz-derivative or one derived by fusing a propylene, trimethylene, or tetramethylene diradical thereto. As used herein, the term "substituted" or "substituent" preferably means that one or more (for example, 1-20, or 1-10, or 1, 2, 3, 4, or 5 or 1, 2, or 3 or 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, halo, haloalkyl, hydroxy, hydroxyalkyl, aryl, heteroaryl, heterocyclyl, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfmyl, alkyl sulfonyl, and cyano. Additionally, non-limiting examples of substituents that can be bonded to a substituted carbon (or other) atom include F, Cl, Br, I, OR', OC(=O)N(R')$_2$, CN, $CF_3$, $OCF_3$, R', O, S, C(=O), methylenedioxy, ethylenedioxy, N(R')$_2$, SR', SOR', $SO_2$R', $SO_2$N(R')$_2$, $SO_3$R', C(=O)R', C(=O)C(=O)R', C(=O)$CH_2$C(=O)R', C(=S)R', C(=O)OR', OC(=O)R', C(=O)N(R')$_2$, OC(=O)N(R')$_2$, C(=S)N(R')$_2$, $(CH_2)_{0-2}$NHC(=O)R', N(R')N(R')C(=O)R', N(R')N(R')C(=O)OR', N(R')N(R')CON(R')$_2$, N(R')$SO_2$R', N(R')$SO_2$N(R')$_2$, N(R')C(=O)OR', N(R')C(=O)R', N(R')C(S)R', N(R')C(=O)N(R')$_2$, N(R')C(S)N(R')$_2$, N(COR')COR', N(OR')R', C(=NH)N(R')$_2$, C(=O)N(OR')R', or C(=NOR')R', wherein R' can be hydrogen or a carbon-based moiety.

As the backbone of copolymer BBCP preferably comprises ethylenically unsaturated carbon-carbon double bonds, the structural units present in each block are preferably covalently linked in such a manner that each of the units is linked to another unit via a carbon-carbon double bond. Copolymer BBCP further preferably comprises two end groups in case it is linear, which is preferred. Each of these end groups is covalently bonded to one structural unit. The end groups of the copolymer (i.e., the initiator end or terminal end), preferably are low molecular weight moieties (e.g. under 500 Da), such as, H, OH, COOH, $CH_2OH$, CN, $NH_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer.

Preferably, the block copolymer BBCP is a brush block copolymer. A brush block copolymer comprises a main chain (backbone) with linear, unbranched side chains. The brushes are often characterized by the high density of grafted chains. The limited space then leads to a strong extension of the side chains.

Preferably, the first block B1 of copolymer BBCP comprises at least one structural unit SU1a represented at least by part structure PS1a-1, and further comprises at least one structural unit SU1b represented by part structure PS1b, and the second block B2 of copolymer BBCP comprises at least one structural unit SU2a represented at least by part structure PS2a-1, and further comprises at least one structural unit SU2b represented by part structure PS1b, wherein independently of one another parameter x is in a range of from 2 to 500, preferably of from 3 to 300, parameter a is in a range of from 2 to 500, preferably of from 3 to 300, the relative ratio of parameters x:a is in a range of from 2:1 to 1:2, preferably of from 1.5:1 to 1:1.5, parameter y is in a range of from 2 to 500, preferably of from 3 to 300, parameter b is in a range of from 2 to 500, preferably of from 3 to 300, the relative ratio of parameters y:b is in a range of from 2:1 to 1:2, preferably of from 1.5:1 to 1:1.5, and the remaining residues and variables have one or more of the meanings defined hereinbefore.

Preferably, the coating composition comprising the at least one block copolymer BBCP used for preparing the second coating layer L2 further comprises at least one preferably linear homopolymer, more preferably at least one homopolymer selected from polyester, poly(meth)acrylate, polyether, polysiloxane and polystyrene homopolymers, still more preferably selected from polystyrene, poylether and polyester homopolymers and mixtures thereof, even more preferably selected from polystyrene and aliphatic polyesters such as polylactide homopolymers and mixtures thereof, wherein the at least one homopolymer preferably has a number average molecular weight ($M_n$), which is at least 100 times, preferably at least 150 times, more preferably at least 175 times, lower than the number average molecular weight ($M_n$) of the at least one copolymer BBCP, and wherein preferably the relative weight ratio of the BBCP copolymer solids to the solids of the at least one homopolymer within the coating composition is in a range of from 99:1 to 5:95, more preferably of from 95:5 to 10:90, even more preferably of from 90:10 to 15:85, still more preferably of from 85:15 to 20:80, yet more preferably of from 75:25 to 25:75, in particular of from 60:40 to 30:70. The method for measuring the number average molecular weight ($M_n$) as well as for measuring the weight average molecular weight ($M_w$) and the polydispersity index (PDI) is described in the 'Methods' section hereinafter.

Methods of preparing such homopolymers are e.g. disclosed in WO 2020/160299 A1 (pages 25/26, example 1) and WO 2020/180427 A1 (pages 25/26, example 1).

Preferably, the at least one homopolymer is present in the second basecoat composition in an amount in the range of from 0 to 90 wt.-%, preferably of from 20 to 80 wt.-%, more preferably of from 40 to 60 wt.-%, in particular of from 30 to 70 wt.-%, based in each case on the total solid content of the second basecoat composition.

Preferably, the relative weight ratio of the BBCP copolymer solids to the solids of said at least one homopolymer within the second basecoat composition is in a range of from 99:1 to 5:95, preferably of from 95:5 to 10:90, more preferably of from 90:10 to 15:85, even more preferably of from 85:15 to 20:80, yet more preferably of from 75:25 to 25:75, in particular of from 60:40 to 30:70.

Preferably, the coating composition comprising the at least one block copolymer BBCP used for preparing the second coating layer L2 comprises at least one further resin, more preferably at least one polymer resin, besides copolymer BBCP and besides the at least one homopolymer as defined above if such a homopolymer is present, wherein the relative weight ratio of the BBCP copolymer solids to the solids of the at least one further resin within the coating composition is preferably in a range of from 5:95 to 100:0, more preferably of from 10:90 to 100:0, even more preferably of from 15:85 to 95:5, still more preferably of from 20:80 to 90:10, yet more preferably of from 25:75 to 85:15, in particular of from 30:70 to 80:20, most preferably of from 40:60 to 80:20.

Preferably, the coating composition comprising the at least one block copolymer BBCP used for preparing the second coating layer L2 comprises, besides copolymer BBCP and besides the at least one homopolymer as defined hereinbefore—if such a homopolymer is present—, wherein the relative weight ratio of the sum of BBCP copolymer solids and homopolymer solids—if present—to the solids of the at least one further resin within the topcoat composition is preferably in a range of from 40:60 to 100:0, more preferably of from 45:55 to 100:0, even more preferably of from 50:50 to 95:5, still more preferably of from 55:45 to 90:10, yet more preferably of from 60:40 to 85:15.

The at least one further resin, preferably the at least one polymer resin, which is optionally present in the second basecoat composition besides copolymer BBCP and besides the at least one homopolymer of present, preferably functions as at least one binder (b1). The same binders including crosslinkers (crosslinking agent)s described hereinbefore in connection with constituent (a1) and described hereinafter in connection with constituent (c1) can also be used as constituent (b1). The optionally present at least one polymer constituent (b1) is, of course, different from copolymer BBCP and from the aforementioned homopolymer.

Coating Layer L3 and Coating Composition Used for Forming Said Layer

The third coating layer L3 is applied over the second coating layer L2. The third coating layer L3 is thus preferably positioned above coating layer L2.

Preferably, the third coating layer L3 is a clearcoat layer formed from a coating composition, which is a clearcoat composition, preferably a solventborne clearcoat composition, wherein the third coating layer L3 preferably is the outermost coating layer of the multilayer coating system. This coating composition is also referred to herein as topcoat composition and is the composition used in step (3) of the inventive method.

The topcoat composition may be an aqueous, i.e. waterborne, coating composition. It may alternatively be a solventborne basecoat composition. In particular, it is, in fact, a solventborne clearcoat composition. The topcoat composition can be 1K-(one-component) or 2K-(two components) composition.

Preferably, the total solid content of the topcoat composition is in the range of from 10 to 65 wt.-%, more preferably of from 15 to 60 wt.-%, even more preferably of from 20 to 50 wt.-%, in particular of from 25 to 45 wt.-%, in each case based on the total weight of the topcoat composition.

The topcoat composition preferably comprises at least one binder, more preferably at least one polymer (c1) as binder. The same binders including crosslinkers described above in connection with constituents (a1) and (b1) can also be used as constituent (c1).

Preferably, the topcoat composition comprises at least one polymer (c1) having on average two or more OH-groups and/or amino groups and/or carbamate groups, more preferably OH-groups and/or carbamate groups. Preferably, the at least one preferably at least OH— and/or carbamate functional polymer (c1) has a weight average molecular weight $M_w$, measured by means of gel permeation chromatography (GPC) against a polystyrene standard, preferably between 800 and 100 000 g/mol, more particularly between 1000 and 75 000 g/mol.

If the topcoat composition is formulated as a 2K coating composition it preferably contains as at least one further polymer (c1) being present therein at least one polyisocyanate having free NCO-groups as crosslinker. If the topcoat composition is formulated as a 1K coating composition it preferably contains as at least one further polymer (c1) being present therein at least one polyisocyanate having blocked NCO-groups and/or at least one melamine formaldehyde resin as crosslinker.

Suitable constituents (c1) for use as crosslinkers are organic constituents bearing on average two or more NCO-groups. The at least one organic constituent used as crosslinker preferably has a cycloaliphatic structure and/or a parent structure that is derived from a cycloaliphatic polyisocyanate by trimerization, dimerization, urethane formation, biuret formation, uretdione formation and/or allophanate formation. Alternatively or additionally, the at least one organic constituent used as crosslinker preferably has an acyclic aliphatic structure and/or a parent structure that is derived from an acyclic aliphatic polyisocyanate by trimerization, dimerization, urethane formation, biuret formation, uretdione formation and/or allophanate formation. The acyclic aliphatic polyisocyanates—optionally serving as parent structures—are preferably substituted or unsubstituted aliphatic polyisocyanates that are known per se. Examples are tetramethylene 1,4-diisocyanate, hexamethylene 1,6-diisocyanate, 2,2,4-trimethylhexane 1,6-diisocyanate, ethylene diisocyanate, dodecane 1,12-diisocyanate, and mixtures of the aforementioned polyisocyanates. The cycloaliphatic polyisocyanates—optionally serving as parent structures—are preferably substituted or unsubstituted cycloaliphatic polyisocyanates which are known per se. Examples of preferred polyisocyanates are isophorone diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylendicyclohexyl diisocyanate (e.g. Desmodur® W from Bayer AG) and mixtures of the aforementioned polyisocyanates. The organic constituents bearing on average two or more NCO-groups mentioned above can also be partially be silanized. Such silanized crosslinking agents are e.g. disclosed in WO 2010/063332 A1, WO 2010/139375 A1 and WO 2009/077181 A1.

Suitable constituents (c1) for use as crosslinkers in particular in case the topcoat compositions are formulated as 1K coating compositions are melamine formaldehyde resins. The same melamine formaldehyde resins can be used which have already been discussed hereinbefore in connection with constituent (a1).

Preferably, the topcoat composition 3) is free of a copolymer (BBCP) as present in the second basecoat composition.

The topcoat composition may be non-pigmented. The topcoat composition, even when it is formulated as a clearcoat composition, however, may alternatively contain coloring and/or effect pigments, preferably coloring pigments, in such amounts that do not interfere with the desired transparency of the clearcoat once cured. For examples, the clearcoat composition may contain up to 7.5 wt.-%, preferably up to 5.0 wt.-%, more preferably up to 2.5 wt.-%, still more preferably up to 1.5 wt.-% of at least one coloring pigment, in each case based on the total solid content of the clearcoat composition. The same applies to optionally present fillers within the clearcoat composition. Preferably, however, the clearcoat composition is free of pigments and/or fillers.

Inventive Method

The inventive method is a method of preparing the inventive multilayer coating system onto an optionally pre-coated substrate comprising at least steps (1), (2), (3) and (4).

The inventive method is both suitable for automotive OEM and refinish applications, in particular for automotive OEM applications.

Preferably, each of steps (1) to (3) is performed via spray application.

At least the second and third coating films, but optionally also the first coating film, are at this stage—after having performed the respective step(s)—preferably each uncured coating films. Thus, at least the coating composition applied in step (3) is preferably applied wet-on-wet onto the second coating film obtained after having performed step (2). If only the resulting second and third coating films are jointly cured in step (4), the inventive method is a 2C1B-method. In this case the first coating film applied in step (1) is cured before step (2) is performed. Alternatively, however, also the coating composition applied in step (2) is preferably applied wet-on-wet on the first coating film obtained after having performed step (1). In this case, when step (2) is performed the first coating film is still an uncured coating film. If the resulting first, second and third coating films are jointly cured in step (4), the inventive method is a 3C1B-method.

Step (1)

According to step (1) a pigmented basecoat composition is applied to at least a portion of an optionally pre-coated substrate and a first coating film is formed on at least a portion of the optionally pre-coated substrate. The basecoat composition used in step (1) of the inventive method is also referred to as "first basecoat composition".

Optional Step (1a)

Preferably, the inventive method further comprises a step (1a), which is carried out after step (1) and before step (2). In said step (1a) the first coating film obtained after step (1) is flashed-off before applying the second basecoat composition in step (2), preferably for a period of 1 to 20 minutes, more preferably for a period of 2 to 15 minutes, in particular for a period of 5 to 10 minutes. Preferably, step (1a) is performed at a temperature not exceeding 40° C., more preferably at a temperature in the range of from 18 to 30° C.

The term "flashing off" in the sense of the present invention preferably means a drying, wherein at least some and/or some amounts of the solvents (water and/or organic solvent(s)) are evaporated from the coating film, before the next coating composition is applied and/or a curing is carried out. No curing is performed by the flashing-off.

Optional Step (1b)

Preferably, the inventive method further comprises a step (1b), which is carried out after step (1) or step (1 a) and before step (2). In said step (1b) the first coating film obtained after step (1) or (1 a) is cured before applying the second basecoat composition in step (2). The same curing conditions can be used/applied that are outlined in detail hereinafter in connection with step (4).

Preferably, steps (1 a) and/or (1b) are performed. More preferably, at least step (1b) is performed so that the second basecoat composition applied in step (2) is applied onto a cured first coating film.

Step (2)

According to step (2) a second basecoat composition comprising the at least one block copolymer BBCP and being different from the basecoat composition applied in step (1) is applied to the first coating film present on the substrate obtained after step (1) and a second coating film is formed, which preferably is adjacent to the first coating film.

Step (2) can be performed prior to curing the first coating film obtained after step (1). Alternatively and preferably, step (2) is performed after curing the first coating film obtained after step (1), i.e. after having performed at least optional step (1b).

Optional Step (2a)

Preferably, the inventive method further comprises a step (2a), which is carried out after step (2) and before step (3). In said step (2a) the second coating film obtained after step (2) is flashed-off before applying the topcoat composition in step (3), preferably for a period of 1 to 20 minutes, more preferably for a period of 2 to 15 minutes, in particular for a period of 5 to 10 minutes. Preferably, step (2a) is performed at a temperature not exceeding 40° C., more preferably at a temperature in the range of from 18 to 30° C.

Step (3)

According to step (3) a coating composition different from the compositions applied in steps (1) and (2) is applied to the second coating film present on the substrate obtained after step (2) and a third coating film is formed, which is preferably adjacent to the second coating film, wherein said coating composition is a topcoat composition and preferably is a clearcoat composition.

Preferably, the third coating film obtained after step (3) is the outermost film of the formed multilayer coating system.

Optional Step (3a)

Preferably, the inventive method further comprises a step (3a), which is carried out after step (3) and before step (4). In said step (3a) the third coating film obtained after step (3) is flashed-off before performing curing step (4), preferably for a period of 1 to 20 minutes, more preferably for a period of 2 to 15 minutes, in particular for a period of 5 to 10 minutes. Preferably, step (3a) is performed at a temperature not exceeding 40° C., more preferably at a temperature in the range of from 18 to 30° C.

Step (4)

According to step (4) at least the second and third coating films applied in steps (2) and (3) and optionally also the first coating film applied in step (1)—in case said first coating film was not cured prior to performing of step (2)—are jointly cured, i.e. simultaneously cured, to obtain a multilayer coating system comprising at least the first, the second and the third coating layers L1, L2 and L3. Each resulting cured coating film represents a coating layer.

Preferably, step (4) is performed at a temperature less than 180° C., preferably less than 160° C., more preferably less than 150° C., in particular at a temperature in the range of from 15 to <180° C. or of from 15 to <160° C., for a period of 5 to 45 minutes, preferably for a period of 20 to 45 minutes, in particular for a period of 25 to 35 minutes. Preferably, however, the minimum curing temperature applied in step (4) is at least 80° C. In this case, curing according to step (4) is preferably performed at a temperature in the range of from 80 to <180° C. or of from 80 to <160° C.

Preferably, curing according to step (4) is selected from chemical curing such as chemical crosslinking, radiation curing, and/or physically drying (non-chemical curing), in each case at room temperature or at an elevated temperature, more preferably is selected from chemical curing, such as chemical crosslinking, and/or physically drying (non-chemical curing), in each case at room temperature or at an elevated temperature, in each case preferably wherein the minimum curing temperature applied in step (4) is at least 80° C.

Inventive Coated Substrate

A further subject-matter of the present invention is a coated substrate obtainable by the inventive method.

All preferred embodiments described hereinabove in connection with the inventive method and the inventive multilayer coating system are also preferred embodiments with regard to the aforementioned inventive coated substrate.

Inventive Use

A further subject-matter of the present invention is a use of a coating composition, which comprises the at least one inventively used block copolymer BBCP for improving, in particular for increasing, the chromaticity of an inventive multilayer coating system, preferably for improving, in particular increasing, its $C^*_{average}$ chroma value, wherein said $C^*_{average}$ chroma value is the sum of C*-values (chroma values according to the L*C*h color model) measured at angles of 15°, 45° and 110°, divided by three, more preferably for improving, in particular increasing, its $C^*_{average}$ chroma value to an $C^*_{average}$ value of at least 40, preferably of at least 42, more preferably of at least 45, even more preferably of at least 50, yet more preferably of at least 55, in particular of at least 60, in particular when the coating composition is used as a second basecoat composition in step (2) of the inventive method.

All preferred embodiments described hereinabove in connection with the inventive method, the inventive multilayer coating system and the inventive coated substrate are also preferred embodiments with regard to the aforementioned inventive use.

Methods

1. Determining the Non-Volatile Fraction

The amount of solid content (non-volatile matter, solid fraction) including the total solid content is determined via DIN EN ISO 3251:2019-09 at 110° C. for 60 min.

2. Measurement of $M_n$, $M_w$, and PDI

The polymer molecular weights (number average molecular weight ($M_n$) and weight average molecular weight ($M_w$)) and molecular weight distributions (PDI; polydispersity index) were determined via gel permeation chromatography (GPC) using a combination of differential refractive index (dRI) and two light scattering (LS) detectors. The use of LS detectors enables analysis of the absolute molecular weight for polymer samples. The solvent for all samples was tetrahydrofuran (THF), with the elution rate of 1.0 mL/minute. Polymer samples were fully dissolved in HPLC grade THF at concentrations ranging from 2.5-7.5 mg/mL, passed through 0.5 um syringe filters, and injected via autosampler. The porous column stationary phase consisted of two Malvern T600 single pore columns with exclusion limits of 20,000,000 Da for poly(styrene). Molecular weights and PDI were determined via OMNISEC software.

3. Measurement of Color Values (L* and C*) as Well as of $R_f$- and $\lambda_{max}$-Values The L*a*b* color space or the L*a*b* color model (i.e. the CIELAB color model) is known to a person skilled in the art. The L*a*b* color model is standardized e.g., in DIN EN ISO/CIE 11664-4:2020-03. Each perceivable color in the L*a*b*-color space is described by a specific color location with the coordinates {L*,a*,b*} in a three-dimensional coordinate system. The a*-axis describes the green or red portion of a color, with negative values representing green and positive values representing red. The b*-axis describes the blue or yellow portion of a color, with negative values for blue and positive values for yellow. Lower numbers thus indicate a more bluish color. The L*-axis is perpendicular to this plane and represents the lightness. The L*C*h color model is similar to the L*a*b* color model and makes use of the same diagram as the L*a*b* color model, but uses cylindrical coordinates instead of rectangular coordinates. In the L*C*h color model, L* also indicates lightness, C* represents chroma, and h is the hue angle. The value of chroma C* is the distance from the lightness axis (L*). The color values L* and C* of a coated substrate before or after baking are determined in accordance with ASTM E 284-81a after its preparation. The values are measured by making use of the instrument BYK-mac i (BYK-Gardner). Analysis of the samples is done in accordance with color, sparkle and graininess measurement with the BYK-mac i spectrophotometer standard operating procedure. The samples to be analyzed are carefully wiped down with a microfiber cloth. The BYK-mac i instrument is then placed onto the substrate surface and performs a measurement using D65 light source at 15°, 45°, and 110° angles with data recorded for each angle. This measurement is taken on an individual panel in at least three different positions and values are averaged over the trials and reported. $\lambda_{max}$-values are measured of the x-axis of the reflectance curves taken using the BYK-mac i spectrophotometer at 15°, 45°, and 110° angles with data recorded for each angle, where the reflectance value ($R_f$) is at a maximum between 400 nm and 700 nm (measurement window). $R_f$ values are measured of the y-axis of the reflectance curves taken using the BYK-mac i spectrophotometer at 15°, 45°, and 110° angles with data recorded for each angle, where the reflectance value ($R_f$) is at a maximum between 400 nm and 700 nm (measurement window).

EXAMPLES

The following examples further illustrate the invention but are not to be construed as limiting its scope. 'Pbw' means parts by weight. If not defined otherwise, 'parts' means 'parts by weight'.

1. Preparation of an Inventively Used Copolymer

To a 2000 mL vessel under inert atmosphere, a norbornene functionalized polyactide macromonomer (PLA-MM) (29.14 mmol, having an $M_n$ of 3.26 kDa) and d,x-DME (dimethyl-5-norbornene-2,3-dicarboxylate with d=endo and x=exo) were added in equimolar amounts in dichloromethane. PLA-MM was prepared prior via a tin-catalyzed ring opening polymerization of lactide using a norbornene alcohol initiator yielding an OH-functional and norbornene functionalized polylactide macromonomer PLA-MM. PLA-MM was prepared in the general manner as described within the supporting information of B.R. Sveinbjörnsson et al., PNAS 2012, 109 (36), p. 14332-14336. A bis-bipyridine ruthenium catalyst was then rapidly added to the mixture of PLA-MM and d,x-DME to initiate copolymerization, targeting $PLA_{100}$-r-$DME_{100}$. "r" means that the two monomeric units PLA and DME are arranged randomly. The mixture was stirred for 45 minutes at room temperature (first block mixture). In a separate vessel under inert atmosphere, a solution of a norbornene functionalized polystyrene macromonomer (PS-MM; having an $M_n$ of 3.83 kDa) and d,x-DIPE (diisopropyl-5-norbornene-2,3-dicarboxylate with d=endo and x=exo) was prepared in dichloromethane (second block mixture). PS-MM was prepared prior in two steps in the general manner as described within example 2 of WO 2020/180427 A1: an OH-functional polymerized precursor of PS-MM was prepared by polymerization of styrene in toluene and sec-butyl lithium as initiator. After chain termination by addition of propylene oxide, followed by methanol, quenching was performed. Then, the terminal OH-group of the formed precursor was transformed into an ester bond via a reaction with a norbornene carboxylic acid to yield PS-MM. The solution of PS-MM and d,-DIPE was added to the first block reaction mixture rapidly. The two monomeric units PS and DIPE are arranged randomly within the formed second block of the copolymer. The resulting mixture was allowed to stir at room temperature for an additional 4 h and then quenched by adding ethyl vinyl ether. Then, quenched catalyst was scavenged using functionalized silica gel absorbent and it was stirred for about 4 h. The mixture was filtered and the solution concentrated under reduced pressure. The solid copolymer was obtained after the solvent is removed. It was dried in a vacuum oven for 4 hours at 75 C to remove residual solvent. The product obtained (BBCP1) was used in this form.

BBCP1 had a number average molecular weight ($M_n$) of 788.3 kDa and a weight average molecular weight ($M_w$) of 865.7 kDa. The polydispersity index (PDI) was 1.10 accordingly.

2. Preparation of BBCP1 Containing Coating Compositions 2.1 Basecoat Compositions BC1 to BC5

BC1 was obtained by preparing a solution of 1.80 g BBCP1, 0.60 g of a polystyrene homopolymer (PS-HP), 0.60 g of a polylactide homopolymer (PLA-HP) and 7 g n-butyl acetate. The relative weight ratio of BBCP1 solids to combined solids of PS-HP and PLA-HP in BC1 was 60:40.

BC2 was obtained by preparing a solution of 1.65 g BBCP1, 0.68 g of a polystyrene homopolymer (PS-HP), 0.68 g of a polylactide homopolymer (PLA-HP) and 7 g n-butyl acetate. The relative weight ratio of BBCP1 solids to combined solids of PS-HP and PLA-HP in BC2 was 55:45.

BC3 was obtained by preparing a solution of 1.50 g BBCP1, 0.75 g of a polystyrene homopolymer (PS-HP), 0.75 g of a polylactide homopolymer (PLA-HP) and 7 g n-butyl acetate. The relative weight ratio of BBCP1 solids to combined solids of PS-HP and PLA-HP in BC3 was 50:50.

BC4 was obtained by preparing a solution of 1.38 g BBCP1, 0.81 g of a polystyrene homopolymer (PS-HP), 0.81 g of a polylactide homopolymer (PLA-HP) and 7 g n-butyl acetate. BC1 had a solids content of 30 wt.-%. The relative weight ratio of BBCP1 solids to combined solids of PS-HP and PLA-HP in BC4 was 46:54.

BC5 was obtained by preparing a solution of 1.20 g BBCP1, 0.90 g of a polystyrene homopolymer (PS-HP), 0.90 g of a polylactide homopolymer (PLA-HP) and 7 g n-butyl acetate. The relative weight ratio of BBCP1 solids to combined solids of PS-HP and PLA-HP in BC5 was 40:60.

The polystyrene homopolymer (PS-HP) used had a $M_n$ of 3.95 kDa. The polylactide homopolymer (PLA-HP) used had a $M_n$ of 4.26 kDa.

2.2 Basecoat Composition BC4a

A diluted composition of BC4 was prepared. Basecoat composition BC4a was obtained by mixing 90 pbw (parts by weight) of BC4 with 10 pbw of n-butyl acetate.

2.3 Basecoat Compositions BC1b, BC3b, BC4b and BC5b as Well as BC4c

Basecoat composition BC1b was obtained by mixing 85 pbw (parts by weight) of BC1 with 15 pbw of R10CG392A. Basecoat composition BC3b was obtained by mixing 85 pbw (parts by weight) of BC3 with 15 pbw of R10CG392A. Basecoat composition BC4b was obtained by mixing 85 pbw (parts by weight) of BC4 with 15 pbw of R10CG392A. Basecoat composition BC5b was obtained by mixing 85 pbw (parts by weight) of BC5 with 15 pbw of R10CG392A. Basecoat composition BC4c was obtained by mixing 90 pbw (parts by weight) of BC4 with 10 pbw of R10CG392A.

R10CG392A is a commercially available 1K high solids clearcoat composition. R10CG392A was mixed to the respective basecoat in each case under agitation.

2.4 Basecoat Compositions BC4-CC1, BC4-CC2, BC4-CC3, BC4-CC4 and BC4-CC5

BC4-CC1 was obtained by mixing 84.7 pbw (parts by weight) of BC4 with 15.3 pbw of R10CG392D. R10CG392D is a commercially available 1K clearcoat composition. BC4-CC2 was obtained by mixing 84.4 pbw (parts by weight) of BC4 with 15.6 pbw of R10CG062T. R10CG062T is a commercially available Uregloss CW® 1K clearcoat composition. BC4-CC3 was obtained by mixing 83.9 pbw (parts by weight) of BC4 with 16.1 pbw of E126CG300. E126CG300 is a commercially available Stargloss® 1K clearcoat composition. BC4-CC4 was obtained by mixing 85.4 pbw (parts by weight) of BC4 with 14.6 pbw of a commercially available 2K Progloss® clearcoat composition. Said 2K clearcoat composition has been in turned prepared from mixing 1 pbw of its B-component (N52CG081) to 3.75 pbw of its A-component (E10CG081G). BC4-CC5 was obtained by mixing 84.8 pbw (parts by weight) of BC4 with 15.2 pbw of a commercially available 2K iGloss® clearcoat composition. Said 2K clearcoat composition has been in turned prepared from mixing 1 pbw of its B-component (N52CG500) to 1 pbw of its A-component (E10CG500B).

3. Preparation of Multilayer Coating Systems

A steel panel bearing a cured primer coat was used as substrate. A commercially available back basecoat (E487KU414T Agate Black or E387KU343C Shadow Black) was spray-applied onto the primer coat as a first basecoat and cured at about 129° C. (265° F.) for 25 minutes. The dry film layer thickness of the resulting black basecoat was in a range of from about 16.5 μm to 19.0 μm (0.65 to 0.75 mils). Then, one of basecoat compositions BC1 to BCS, BC1b, BC3b, BC5b, BC4a, BC4b, and BC4c as well as BC4-CC1, BC4-CC2, BC4-CC3, BC4-CC4 and BC4-CC5 was applied as a second basecoat (midcoat) composition onto the cured first basecoat film by a draw down bar using a 200 μm-gap on a standard draw down bar applicator available from the company Byk in an amount that results in a dry film layer thickness of 27 to 54 μm later upon baking. After a flash-off at room temperature (23° C.) for up to 10 minutes after application of the second basecoat composition one of commercially available clearcoat compositions CC1 (R10CG392D, 1K clearcoat composition), CC2 (R10CG062T, a Uregloss® 1K clearcoat composition), CC3 (E126CG300, a Stargloss® 1K clearcoat composition), CC4 (E10CG081G+N52CG081, a 2K Progloss® clearcoat composition, where 1 pbw of the B-component (N52CG081) is added to 3.75 pbw of the A-component (E10CG081G)), and CC5 (E10CG500B+N52CG500, an iGloss® 2K clearcoat composition, where 1 pbw of the B-component (N52CG500) is added to 1 pbw of the A-component (E10CG500B)) was spray-applied wet-on-wet as a clearcoat onto the uncured/non-baked second basecoat film in amount that results in a dry film layer thickness of the clear coat layer of 45 to 55 μm later upon baking. Then, the two coating films applied were jointly baked for 30 minutes at about 140° C. (285° F.) or at about 130° C. (265° F.). Additionally, basecoat composition BC4 was applied onto the cured first basecoat film as a topcoat (no clearcoat was applied) and the resulting topcoat film was baked for 30 minutes at about 140° C. (285° F.) or dried at 24° C. (75° F.) for 24 hours in comparative experiments. In addition, comparative experiments were carried out, wherein in each case no clearcoat composition was applied, but wherein instead one of the basecoat compositions BC4, BC4a, BC1b, BC4b and BC5b was applied as topcoat composition and not as a second basecoat (midcoat) composition for comparison value only.

4. Properties of the Substrates Coated With the Multilayer Coating Systems

Each coated substrate obtained as outlined in item 3. was subjected to an investigation of its color values C* as well as of its $R_f$- and $\lambda_{max}$-values. Measurement of these values was performed according to the methods disclosed in the 'Methods' section. The measured values are indicated in Tables 1 to 9. $C^*_{average}$ is the C*-value of the sum of the C*-values measured at 15°, 45° and 110°, divided by three.

TABLE 1a

C* as well as $R_f$- and $\lambda_{max}$-values of coated substrates, baking temperature 130° C., part I

| | CC1 applied on BC4 | CC1 applied on BC4a | CC1 applied on BC4c |
|---|---|---|---|
| C* (15°) | 102.58 | 87.7 | 65.86 |
| C* (45°) | 63.6 | 68.41 | 74.3 |
| C* (110°) | 40.53 | 44.85 | 61.56 |
| $C_{average}$* | 68.90 | 66.98 | 67.24 |
| $\lambda_{max}$ (15°) | 436 | 429 | 414 |
| $\lambda_{max}$ (45°) | 462 | 457 | 434 |
| $\lambda_{max}$ (110°) | 473 | 471 | 458 |
| $R_f$ (15°) | 0.74 | 0.63 | 0.39 |
| $R_f$ (45°) | 0.41 | 0.42 | 0.33 |
| $R_f$ (110°) | 0.27 | 0.33 | 0.35 |

TABLE 1b

C* as well as $R_f$- and $\lambda_{max}$-values of coated substrates, baking temperature 130° C., part I - comparative examples

| | BC4 applied as topcoat, no (additional) clearcoat | BC4a applied as topcoat, no (additional) clearcoat |
|---|---|---|
| C* (15°) | 60.14 | 68.08 |
| C* (45°) | 43.89 | 40.01 |
| C* (110°) | 38.49 | 33.42 |
| $C_{average}$* | 47.51 | 47.17 |
| $\lambda_{max}$ (15°) | 456 | 458 |
| $\lambda_{max}$ (45°) | 480 | 485 |
| $\lambda_{max}$ (110°) | 499 | 502 |

TABLE 1b-continued

C* as well as $R_f$- and $\lambda_{max}$-values of coated substrates, baking temperature 130° C., part I - comparative examples

| | BC4 applied as topcoat, no (additional) clearcoat | BC4a applied as topcoat, no (additional) clearcoat |
|---|---|---|
| $R_f$ (15°) | 0.49 | 0.61 |
| $R_f$ (45°) | 0.36 | 0.35 |
| $R_f$ (110°) | 0.34 | 0.24 |

TABLE 2

C* as well as $R_f$- and $\lambda_{max}$-values of coated substrates, baking temperature 130° C., part II

| | CC1 applied on BC1 | CC1 applied on BC2 | CC1 applied on BC3 | CC1 applied on BC4 | CC1 applied on BC5 |
|---|---|---|---|---|---|
| C* (15°) | 60.88 | 76.28 | 92.04 | 102.58 | 76.48 |
| C* (45°) | 101.51 | 96.1 | 87.26 | 63.6 | 45.98 |
| C* (110°) | 88.04 | 76 | 61.63 | 40.53 | 44.61 |
| $C_{average}$* | 83.48 | 82.79 | 80.31 | 68.90 | 55.69 |
| $\lambda_{max}$ (15°) | <400 | <400 | 420 | 436 | 459 |
| $\lambda_{max}$ (45°) | 421 | 431 | 446 | 462 | 490 |
| $\lambda_{max}$ (110°) | 432 | 443 | 459 | 473 | 500 |
| $R_f$ (15°) | 0.62 | 0.67 | 0.68 | 0.74 | 0.73 |
| $R_f$ (45°) | 0.62 | 0.46 | 0.46 | 0.41 | 0.4 |
| $R_f$ (110°) | 0.39 | 0.28 | 0.32 | 0.27 | 0.25 |

TABLE 3a

C* as well as $R_f$- and $\lambda_{max}$-values of coated substrates, baking temperature 130° C., part III

| | CC1 applied on BC1b | CC1 applied on BC4b | CC1 applied on BC5b |
|---|---|---|---|
| C* (15°) | 26.79 | 67.02 | 75.7 |
| C* (45°) | 56.74 | 76.17 | 60.09 |
| C* (110°) | 83.95 | 60.98 | 41.25 |
| $C_{average}$* | 55.82 | 68.06 | 59.01 |
| $\lambda_{max}$ (15°) | <400 | 409 | 429 |
| $\lambda_{max}$ (45°) | <400 | 432 | 457 |
| $\lambda_{max}$ (110°) | 420 | 456 | 478 |
| $R_f$ (15°) | 0.16 | 0.41 | 0.52 |
| $R_f$ (45°) | 0.38 | 0.36 | 0.39 |
| $R_f$ (110°) | 0.45 | 0.34 | 0.36 |

TABLE 3b

C* as well as $R_f$- and $\lambda_{max}$-values of coated substrates, baking temperature 130° C., part III - comparative

| | BC1b applied as topcoat, no (additional) clearcoat | BC4b applied as topcoat, no (additional) clearcoat | BC5b applied as topcoat, no (additional) clearcoat |
|---|---|---|---|
| C* (15°) | 11.83 | 73.05 | 69.95 |
| C* (45°) | 37.57 | 72.51 | 51.46 |
| C* (110°) | 74.3 | 50.63 | 40.97 |
| $C_{average}$* | 41.23 | 65.40 | 54.13 |
| $\lambda_{max}$ (15°) | <400 | 420 | 440 |
| $\lambda_{max}$ (45°) | <400 | 441 | 465 |
| $\lambda_{max}$ (110°) | 421 | 466 | 489 |
| $R_f$ (15°) | 0.19 | 0.49 | 0.51 |
| $R_f$ (45°) | 0.16 | 0.35 | 0.36 |
| $R_f$ (110°) | 0.31 | 0.34 | 0.33 |

The data displayed in Tables 1a, 1b, 2, 3a and 3b show that applying a clearcoat composition onto an unbaked BBCP1-containing midcoat film to obtain a clearcoat film and jointly baking of the two films leads to multilayer coating systems having in particular an improved chromaticity (increased chroma C* values). In particular from Table 2 it is evident that a strong red shift to a green appearance is observed, which is often desirable. That data displayed in Table 3 also confirms that. In addition, when using any of BC1 b, BC4b and BC5b the chroma is even further increased.

TABLE 4

C* as well as $R_f$- and $\lambda_{max}$-values of coated substrates, part IV - in all cases baking at 140° C. was performed

| | CC1 applied on BC4 | CC1 applied on BC4a | CC1 applied on BC4-CC1 |
|---|---|---|---|
| C* (15°) | 75.89 | 88.05 | 51.35 |
| C* (45°) | 68.72 | 78.19 | 72.88 |
| C* (110°) | 46.11 | 52.19 | 72.79 |
| $C_{average}$* | 63.57 | 72.81 | 65.67 |
| $\lambda_{max}$ (15°) | 422 | 426 | <400 |
| $\lambda_{max}$ (45°) | 455 | 450 | 421 |
| $\lambda_{max}$ (110°) | 471 | 466 | 440 |
| $R_f$ (15°) | 0.64 | 0.73 | 0.43 |
| $R_f$ (45°) | 0.47 | 0.45 | 0.37 |
| $R_f$ (110°) | 0.37 | 0.33 | 0.36 |

TABLE 5

C* as well as $R_f$- and $\lambda_{max}$-values of coated substrates, part V - in all cases baking at 140° C. was performed

| | CC2 applied on BC4 | CC2 applied on BC4a | CC2 applied on BC4-CC2 |
|---|---|---|---|
| C* (15°) | 77.38 | 86.97 | 71.06 |
| C* (45°) | 59.52 | 67.11 | 74.9 |
| C* (110°) | 34.62 | 44.24 | 56.18 |
| $C_{average}$* | 57.17 | 66.12 | 68.38 |
| $\lambda_{max}$ (15°) | 431 | 429 | 419 |
| $\lambda_{max}$ (45°) | 458 | 460 | 441 |
| $\lambda_{max}$ (110°) | 480 | 473 | 461 |
| $R_f$ (15°) | 0.68 | 0.81 | 0.47 |
| $R_f$ (45°) | 0.4 | 0.54 | 0.36 |
| $R_f$ (110°) | 0.18 | 0.41 | 0.35 |

TABLE 6

C* as well as $R_f$- and $\lambda_{max}$-values of coated substrates, part VI - in all cases baking at 140° C. was performed

| | CC3 applied on BC4 | CC3 applied on BC4a | CC3 applied on BC4-CC3 |
|---|---|---|---|
| C* (15°) | 75.58 | 85.2 | 66.33 |
| C* (45°) | 50.01 | 53.94 | 59.28 |
| C* (110°) | 34.49 | 34.96 | 41.59 |
| $C_{average}$* | 53.36 | 58.03 | 55.73 |
| $\lambda_{max}$ (15°) | 440 | 438 | 426 |
| $\lambda_{max}$ (45°) | 469 | 463 | 450 |
| $\lambda_{max}$ (110°) | 485 | 480 | 470 |
| $R_f$ (15°) | 0.73 | 0.73 | 0.45 |
| $R_f$ (45°) | 0.44 | 0.39 | 0.34 |
| $R_f$ (110°) | 0.27 | 0.28 | 0.32 |

TABLE 7

C* as well as $R_f$- and $\lambda_{max}$-values of coated substrates, part VII - in all cases baking at 140° C. was performed

| | CC4 applied on BC4 | CC4 applied on BC4a | CC4 applied on BC4-CC4 |
|---|---|---|---|
| C* (15°) | 76.69 | 86.54 | 71.81 |
| C* (45°) | 45.91 | 44.78 | 57.57 |
| C* (110°) | 49.16 | 34.18 | 39.56 |
| $C_{average}$* | 57.25 | 55.16 | 56.31 |
| $\lambda_{max}$ (15°) | 438 | 445 | 422 |
| $\lambda_{max}$ (45°) | 475 | 473 | 447 |
| $\lambda_{max}$ (110°) | 495 | 488 | 468 |
| $R_f$ (15°) | 0.72 | 0.73 | 0.51 |
| $R_f$ (45°) | 0.52 | 0.4 | 0.34 |
| $R_f$ (110°) | 0.47 | 0.26 | 0.3 |

TABLE 8

C* as well as $R_f$- and $\lambda_{max}$-values of coated substrates, part VIII - in all cases baking at 140° C. was performed

| | CC5 applied on BC4 | CC5 applied on BC4a | CC5 applied on BC4-CC5 |
|---|---|---|---|
| C* (15°) | 72.03 | 84.82 | 42.06 |
| C* (45°) | 64.02 | 60.73 | 65.9 |
| C* (110°) | 41.55 | 44.74 | 76.29 |
| $C_{average}$* | 59.2 | 63.43 | 61.42 |
| $\lambda_{max}$ (15°) | 428 | 438 | <400 |
| $\lambda_{max}$ (45°) | 458 | 462 | 407 |
| $\lambda_{max}$ (110°) | 477 | 478 | 431 |
| $R_f$ (15°) | 0.57 | 0.72 | 0.31 |
| $R_f$ (45°) | 0.44 | 0.47 | 0.3 |
| $R_f$ (110°) | 0.24 | 0.31 | 0.32 |

TABLE 9

Summary of selected experimental data

| Baking | BC4 applied as topcoat (no clear-coat on top) no, only drying | BC4 applied as topcoat (no clear-coat on top) yes, 140° C. | CC1 ap-plied on BC4 yes, 140° C. | CC2 ap-plied on BC4 yes, 140° C. | CC3 ap-plied on BC4 yes, 140° C. | CC4 ap-plied on BC4 yes, 140° C. | CC5 ap-plied on BC4 yes, 140° C. |
|---|---|---|---|---|---|---|---|
| C* (15°) | 72.28 | 60.97 | 75.89 | 77.38 | 75.58 | 76.69 | 72.03 |
| C* (45°) | 62.88 | 41.6 | 68.72 | 59.52 | 50.01 | 45.91 | 64.02 |
| C* (110°) | 49.21 | 30.36 | 46.11 | 34.62 | 34.49 | 49.16 | 41.55 |
| $C_{average}$* | 61.46 | 44.31 | 63.57 | 57.17 | 53.36 | 57.25 | 59.2 |

The data displayed in Tables 4 to 8 show that applying a variety of chemically different clearcoat compositions onto an unbaked BBCP1-containing midcoat film and subsequent baking of the films together in all cases leads to multilayer coating systems having excellent chromaticity (increased chroma C* values). This is summarized in Table 9. It is further evident from Table 9 that the presence of a clearcoat onto the BBCP1 containing midcoat halts the color shift observed with baking: when no clearcoat is applied on top of the BBCP1 containing coat (i.e. when said coat represents the uppermost layer) and said coat is baked, a significant loss of chroma has been found to occur in some cases, which is undesired. Applying a clearcoat onto the unbaked BBCP1 containing film and subsequent baking of the two films, however, unexpectedly prevents this loss of chroma. Said loss of chroma is also not observed when drying the BBCP1 containing coat instead of baking. Performance of drying instead of baking, however, is unwanted and disadvantageous from an economic point of view as in OEM assembly the process steps have to be sped up as much as possible.

The invention claimed is:

1. A multilayer coating system present on an optionally pre-coated substrate and comprising at least three coatings layers L1, L2 and L3 different from one another, the multilayer coating system comprising:

a first pigmented coating layer L1 applied over at least a portion of an optionally pre-coated substrate, a second coating layer L2 applied over the first pigmented coating layer L1, and a third coating layer L3 applied over the second coating layer L2, wherein the second coating layer L2 is formed from a coating composition comprising at least one block copolymer containing a backbone and at least two blocks B1 and B2 different from one another, wherein block B1 comprises at least one kind of side chains S1 attached to the backbone and block B2 comprises at least one kind of side chains S2 attached to the backbone, which are different from side chains S1, wherein each of side chains S1 comprises at least one polymeric moiety M1 selected from the group consisting of polyester, polyether and poly(meth)acrylate moieties, and each of side chains S2 comprises at least one polymeric moiety M2 different from polymeric moiety M1 and selected from the group consisting of polyester, poly(meth)acrylate, polyether, polysiloxane and polystyrene moieties.

2. The multilayer coating system according to claim 1, wherein the coating composition comprising the at least one block copolymer is free of any pigments.

3. The multilayer coating system according to claim 1 wherein the first pigmented coating layer L1 is capable of absorbing at least those wavelengths that are not reflected by the second layer L2.

4. The multilayer coating system according to claim 1, wherein the third coating layer L3 is formed from a coating composition, which is a clearcoat composition.

5. The multilayer coating system according to claim 1, wherein the second and the third coating layers L2 and L3 are positioned adjacently to each other.

6. The multilayer coating system according to claim 1, wherein the multilayer coating system has a C*average value of at least 40, the C*average value being the sum of C *-values (chroma values according to the L*C*h color model) measured at angles of 15°, 45° and 110°, divided by three.

7. The multilayer coating system according to claim 1, wherein it is obtainable by a method, according to which at least the applied coating composition comprising the at least one block copolymer, which is used for preparing the second coating layer L2, and the applied coating composition used for preparing the third coating layer L3 are jointly cured to obtain the second and third coating layers L2 and L3 of the multilayer coating system.

8. The multilayer coating system according to claim 1, wherein the backbone of the copolymer comprises ethylenically unsaturated carbon-carbon double bonds.

9. The multilayer coating system according to claim 1, wherein the at least one copolymer has a number average molecular weight ($M_n$) in a range of from 450 to 3000 kDa.

10. The multilayer coating system according to claim 1, wherein the first block B1 of the copolymer comprises at least one structural unit SU1a and optionally at least one structural unit SU1b, wherein structural unit SU1a is represented by at least one of part structures PS1a-1 and PS1a-2, and wherein optionally present structural unit SU1b is represented by part structure PS1b, (PS1a-1)

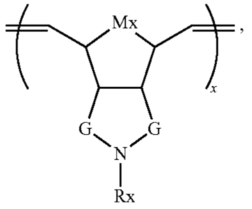

(PS1a-2)

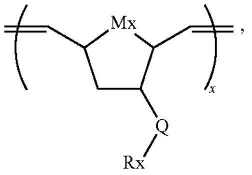

(PS1b)

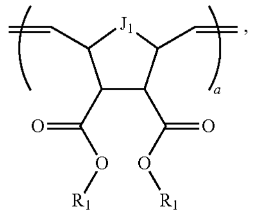

wherein independently of one another parameter x is in a range of from 1 to 1000, parameter a is in a range of from 0 to 1000, the relative ratio of parameters x: a is in a range of from 1:0 to 1:3, Mx, $J_1$ and G represent independently of one another $CH_2$ or C═O, Q represents a divalent alkyl, heteroalkyl, cycloalkyl, heterocycloalkyl, aryl or heteroaryl residue, Rx represents side chain S1 comprising polymeric moiety M1, and R1 represents a $C_1$-$C_6$-alkyl residue, and the second block B2 of the copolymer comprises at least one structural unit SU2a and optionally at least one structural unit SU2b, wherein structural unit SU2a is represented by at least one of part structures PS2a-1 and PS2a-2, and wherein optionally present structural unit SU2b is represented by part structure PS2b, (PS2a-1)

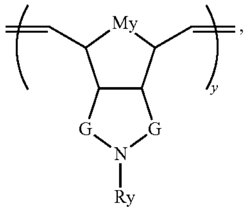

(PS2a-2)

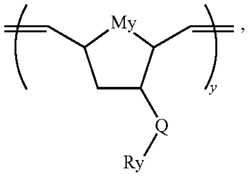

(PS2b)

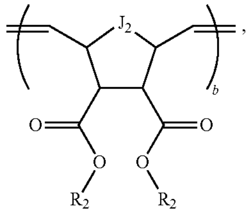

wherein independently of one another parameter y is in a range of from 1 to 1000, parameter b is in a range of from 0 to 1000, the relative ratio of parameters y: b is in a range of from 1:0 to 1:3, My, $J_2$ and G represent independently of one another $CH_2$ or C═O, Q represents a divalent alkyl, heteroalkyl, cycloalkyl, heterocycloalkyl, aryl or heteroaryl residue, Ry represents side chain S2 comprising polymeric moiety M2, and $R_2$ represents a $C_1$-$C_6$-alkyl residue.

11. The multilayer coating system according to claim 1, wherein the at least one copolymer is present in the coating composition used for preparing the second coating layer L2, in an amount in the range of from 10 to 100 wt.-%, based in each case on the total solid content of the coating composition.

12. The multilayer coating system according to claim 1, wherein the coating composition comprising the at least one block copolymer used for preparing the second coating layer L2, further comprises at least one homopolymer.

13. The multilayer coating system according to claim 1, wherein the coating composition comprising the at least one block copolymer used for preparing the second coating layer L2 comprises at least one further resin.

14. The multilayer coating system according to claim 1, wherein the topcoat layer L3 is a clearcoat layer formed from a coating composition, which is a solventborne clearcoat composition.

15. The multilayer coating system according to claim 1, wherein the topcoat layer L3 is the outermost coating layer of the multilayer coating system.

16. The multilayer coating system according to claim 1, wherein the first and the second coating layers L1 and L2 are positioned adjacently to each other.

17. A method for preparing the multilayer coating system according to claim 1, comprising (1) applying a pigmented basecoat composition to at least a portion of an optionally pre-coated substrate and forming a first coating film on at least a portion of the optionally pre-coated substrate, (2) applying a second basecoat composition comprising the at least one block copolymer and being different from the basecoat composition applied in step (1) to the first coating film present on the substrate obtained after step (1) and forming a second coating film, (3) applying a coating composition different from the compositions applied in steps (1) and (2) to the second coating film present on the substrate obtained after step (2) and forming a third coating film, and (4) jointly curing at least the second and third coating films applied in steps (2) and (3) and optionally also the first coating film applied in step (1) in case said first coating film was not cured prior to performing of step (2) to obtain a multilayer coating system comprising at least the first, the second and the third coating layers L1, L2 and L3.

18. A coated substrate obtained by the method according to claim 17.

19. A method of using a coating composition comprising at least one block copolymer, the method comprising using the coating composition as defined in claim 1 for forming the second coating layer L2 for improving the chromaticity of the multilayer coating system according to claim 1.

* * * * *